United States Patent
Xia et al.

(10) Patent No.: US 11,595,184 B2
(45) Date of Patent: Feb. 28, 2023

(54) BASE STATION, USER EQUIPMENT AND WIRELESS COMMUNICATION METHOD

(71) Applicant: Panasonic Intellectual Property Corporation of America, Torrance, CA (US)

(72) Inventors: Xiaohan Xia, Beijing (CN); Lilei Wang, Beijing (CN); Masayuki Hoshino, Chiba (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 225 days.

(21) Appl. No.: 16/322,028

(22) PCT Filed: Aug. 11, 2016

(86) PCT No.: PCT/CN2016/094625
§ 371 (c)(1),
(2) Date: Jan. 30, 2019

(87) PCT Pub. No.: WO2018/027797
PCT Pub. Date: Feb. 15, 2018

(65) Prior Publication Data
US 2019/0190685 A1 Jun. 20, 2019

(51) Int. Cl.
*H04L 5/14* (2006.01)
*H04L 5/00* (2006.01)
(Continued)

(52) U.S. Cl.
CPC ............ *H04L 5/143* (2013.01); *H04J 13/004* (2013.01); *H04L 5/0044* (2013.01);
(Continued)

(58) Field of Classification Search
None
See application file for complete search history.

(56) References Cited

U.S. PATENT DOCUMENTS

2002/0196766 A1* 12/2002 Hwang ................. H04W 52/56
370/342
2003/0193925 A1* 10/2003 Mujtaba ................ H04L 5/023
370/347
(Continued)

FOREIGN PATENT DOCUMENTS

| CN | 103974434 A | 8/2014 |
|---|---|---|
| JP | 2015-510317 A | 4/2015 |

(Continued)

OTHER PUBLICATIONS

International Search Report of PCT application No. PCT/CN2016/094625 dated Apr. 25, 2017.
(Continued)

*Primary Examiner* — Jason E Mattis
*Assistant Examiner* — Bao G Nguyen
(74) *Attorney, Agent, or Firm* — Seed IP Law Group LLP

(57) ABSTRACT

Provided are a base station, user equipment and wireless communication method related to RS collision cancellation in full duplex communication. A base station comprises: circuitry operative to perform at least one of a first processing and a second processing on downlink signals to be transmitted on a physical resource unit in a full duplex mode corresponding to one Transmission Time Interval (TTI); a transmitter operative to transmit the processed downlink signals on the physical resource unit to a first user NO equipment in a TTI; and a receiver operative to receive uplink signals on the physical resource unit from a second user equipment, wherein the first processing is use to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a
(Continued)

reference signal, and the second processing comprises suppressing at least part of the downlink signals assigned on the resource elements assigned with uplink reference signals thereon in the collided resource elements.

17 Claims, 13 Drawing Sheets

(51) Int. Cl.
  *H04J 13/00* (2011.01)
  *H04L 5/18* (2006.01)
(52) U.S. Cl.
  CPC .............. *H04L 5/1461* (2013.01); *H04L 5/18* (2013.01); *H04L 5/0007* (2013.01); *H04L 5/1423* (2013.01)

(56) References Cited

U.S. PATENT DOCUMENTS

| | | | |
|---|---|---|---|
| 2012/0230290 A1* | 9/2012 | Seo | H04L 1/0026 370/329 |
| 2014/0328283 A1 | 11/2014 | Wan et al. | |
| 2015/0180640 A1 | 6/2015 | Liu | |
| 2015/0311928 A1 | 10/2015 | Chen et al. | |
| 2015/0350986 A1* | 12/2015 | Wigren | H04W 36/34 370/332 |
| 2016/0006529 A1* | 1/2016 | Yi | H04J 11/005 370/329 |
| 2016/0099802 A1 | 4/2016 | Noh et al. | |
| 2016/0127114 A1 | 5/2016 | Kim et al. | |
| 2016/0330011 A1* | 11/2016 | Lee | H04L 5/006 |
| 2017/0034790 A1* | 2/2017 | Lopez-Perez | H04W 72/1278 |
| 2017/0034837 A1* | 2/2017 | Lopez-Perez | H04W 72/0413 |
| 2018/0006690 A1* | 1/2018 | Shepard | H04B 7/0615 |
| 2019/0098638 A1* | 3/2019 | Kakishima | H04B 7/0619 |

FOREIGN PATENT DOCUMENTS

| | | |
|---|---|---|
| JP | 2016-521942 A | 7/2016 |
| WO | 2014/117730 A1 | 8/2014 |

OTHER PUBLICATIONS

English Translation of Chinese Search Report dated Aug. 26, 2022 for the related Chinese Patent Application No. 201680087952.9. (2 pages).

* cited by examiner

BASE STATION, USER EQUIPMENT AND WIRELESS COMMUNICATION METHOD

BACKGROUND

1. Technical Field

The present disclosure relates to the field of wireless communication, and in particular, to a base station, a user equipment (UE) and a wireless communication method related to full duplex.

2. Description of the Related Art

Full duplex is a further study in 3GPP (The 3rd Generation Partnership Project) and means DL (Downlink) and UL (Uplink) channels can be transmitted in the same time/frequency resources. Full duplex is supposed to be a desired feature in NR (New Radio access technology)/5G as it can largely improve the spectral efficiency. Specifically, in order to facilitate understanding the concept of full duplex in NR, FIG. 1 schematically illustrates three cases for comparison: (A) FDD (Frequency Division Duplexing) LTE (Long Term Evolution); (B) TDD (Time Division Duplexing) LTE; and (C) full duplex in NR. As shown in FIG. 1(A)-(C), the horizontal axis indicated by T represents time domain while the vertical axis indicated by F represents frequency domain. It can be seen from FIG. 1(A)-(B) that, in FDD LTE, DL and UL channels uses different frequency resources at a same time resource, while in TDD LTE, DL and UL channels uses different time resources at a same frequency resource. In contrast, as shown in FIG. 1(C), in full duplex, DL and UL channels are in same PRBs (Physical Resource Blocks), that is, use same physical (i.e. time/frequency) resources. Thus, when compared with traditional FDD and TDD, full duplex can largely improve the spectral efficiency.

SUMMARY

One non-limiting and exemplary embodiment provides an approach to reduce the interference on reference signals in full-duplex.

In a first general aspect of the present disclosure, there is provided a base station comprising: circuitry operative to perform at least one of a first processing and a second processing on downlink signals to be transmitted on a physical resource unit in a full duplex mode corresponding to one Transmission Time Interval (TTI); a transmitter operative to transmit the processed downlink signals on the physical resource unit to a first user equipment in a TTI; and a receiver operative to receive uplink signals on the physical resource unit from a second user equipment, wherein the first processing is use to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal, and the second processing comprises suppressing at least part of the downlink signals assigned on the resource elements assigned with uplink reference signals thereon in the collided resource elements.

In a second general aspect of the present disclosure, there is provided a user equipment comprising: a receiver operative to receive first downlink signals from a base station; and a transmitter operative to transmit second uplink signals to the base station, wherein when the first downlink signals are received and/or the second uplink signals are transmitted on a physical resource unit in a full duplex mode corresponding to one Transmission Time Interval (TTI), at least one of Code Division Multiplexing (CDM) and signal suppression is applied to at least part of collided resource elements in the physical resource unit, each of the collided resource elements being assigned with both a downlink signal and a uplink signal at least one of which is a reference signal.

In a third general aspect of the present disclosure, there is provided a wireless communication method for a physical resource unit in a full duplex mode corresponding to one Transmission Time Interval (TTI), the physical resource unit being assigned with uplink and downlink signals to be transmitted in a TTI, the method comprising: performing at least one of a first processing and a second processing on at least the downlink signals of uplink and downlink signals before transmission; and transmitting the downlink signals on the physical resource unit in a TTI from a base station and transmitting the uplink signals on the physical resource unit in the TTI from a user equipment, wherein the first processing is used to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal, and the second processing comprises suppressing at least part of the downlink signals assigned on at least resource elements assigned with uplink reference signals thereon in the collided resource elements.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
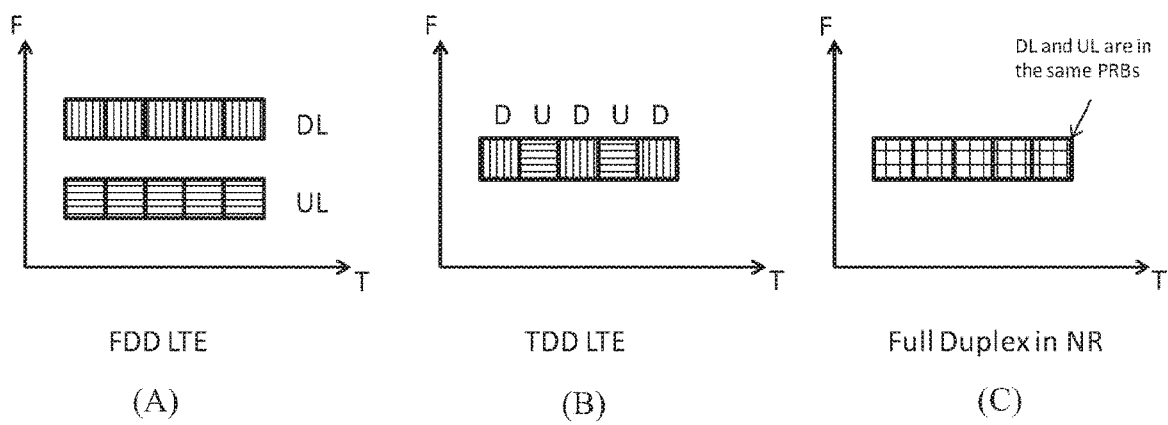
FIG. 1 schematically illustrates three cases for comparison: (A) FDD (Frequency Division Duplexing) LTE (Long Term Evolution); (B) TDD (Time Division Duplexing) LTE; and (C) full duplex in NR.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

To achieve full duplex, a radio has to cancel the significant self-interference that results from its own transmission to the received signal. If self-interference is not largely canceled, residual self-interference acts as noise to the received signal and may largely reduce SNR (Signal-Noise Ratio) and consequent throughput. Thus, one of the biggest issues in full duplex is RS (reference signal) collisions (i.e. the interference on reference signals), as the RS collisions may heavily affect channel quality estimation and demodulation performance. However, while DL and UL transmission are deployed in the same physical resource as shown in FIG. 1(C) for example, the RS collisions may be unavoidable.

Figure 2:
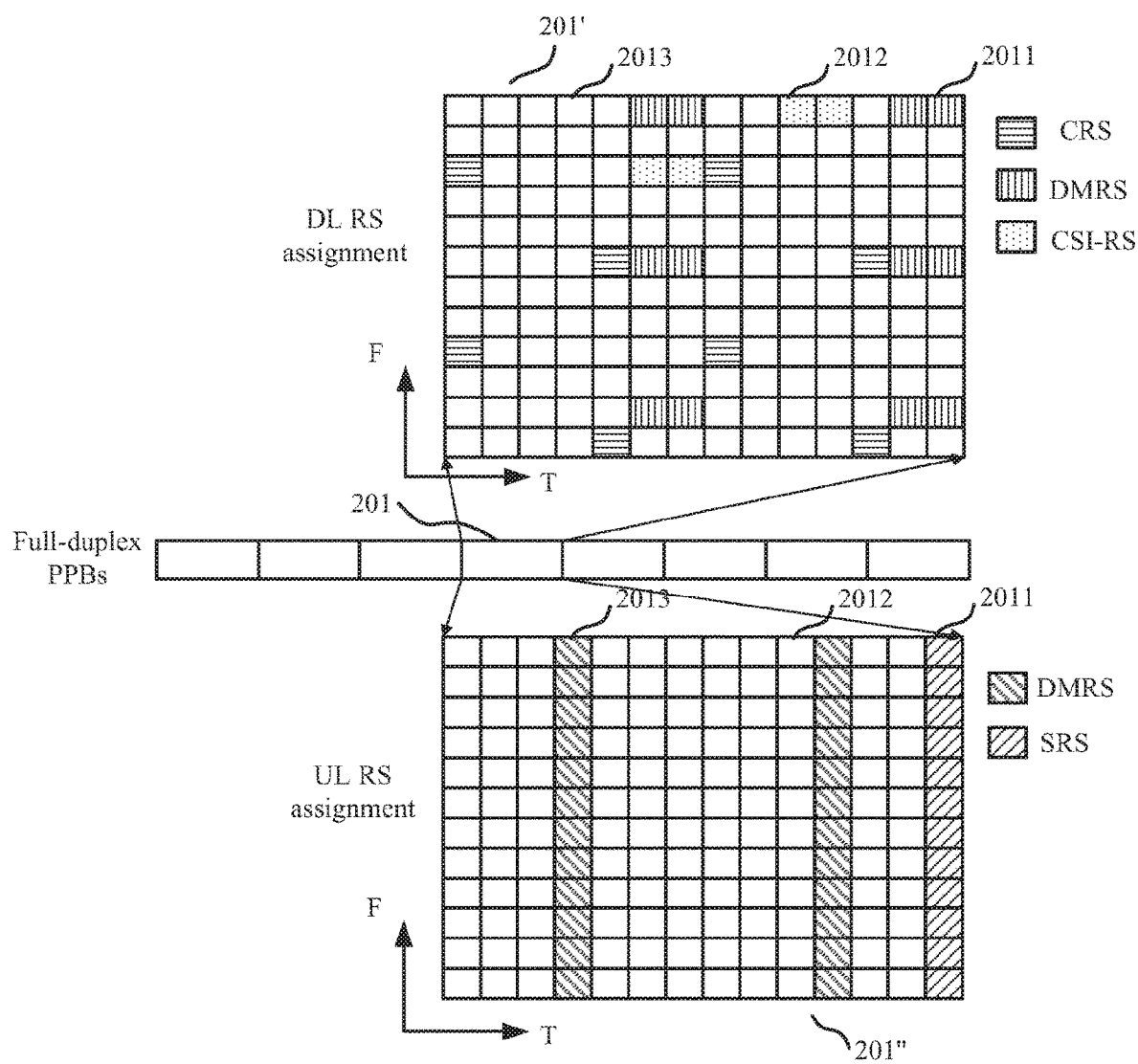
FIG. 2 schematically illustrates an example of RS collisions in full duplex.

Here, FIG. 2 schematically illustrates an example of RS collisions in full duplex. In FIG. 2, PRB 201 is assumed to be a full-duplex PRB in which both UL and DL channels are assigned. And, it is assumed that PRB 201 has a LTE frame structure and LTE RS assignments are taken as an example here. For example, the upper block 201' shows DL RS assignment while the lower block 201" shows UL RS assignment. It is noted that blocks 201' and 201" are both equivalent to the PRB 201 and each small square in blocks 201' and 201" represents a RE (resource element).

More specifically, as shown in block 201', small squares filled with horizontal lines represent REs assigned with DL CRSs (Cell-specific Reference Signals), small squares filled with vertical lines represent REs assigned with DL DMRSs (Dedicated Modulation Reference Signals), small squares filled with points represent REs assigned with DL CSI-RSs (Channel State Information Reference Signals) and blank small squares represent REs assigned with DL data. In addition, as shown in block 201", small squares filled with left oblique lines represent REs assigned with UL DMRSs, small squares filled with right oblique lines represent REs assigned with UL SRSs (Sounding Reference Signals) and blank small squares represent REs assigned with UL data.

As shown in FIG. 2, RS collisions include RS-RS collisions and RS-data collisions. The RS-RS collision means that a collision occurs between DL RS and UL RS as shown in RE 2011 for example. The RS-data collision means that a collision occurs between DL RS and UL data as shown in RE 2012, or between DL data and UL RS as shown in RE 2013.

As described above, such RS collisions may heavily affect channel quality estimation and demodulation performance. Now, how to solve the RS collisions is one of most important issue in full duplex. However, so far there is less discussion on RS collisions in full duplex in 5G/NR.

Figure 3:
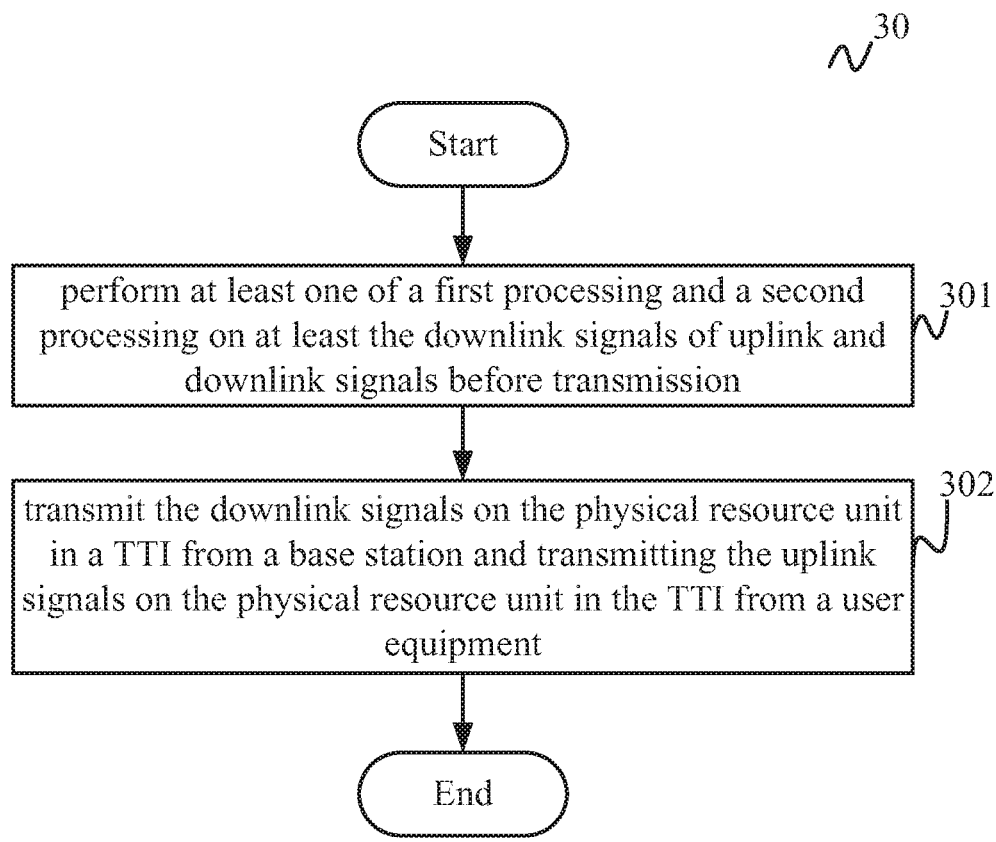
FIG. 3 illustrates a flowchart of a wireless communication method according to an embodiment of the present disclosure.

In an embodiment of the present disclosure, there is provided a wireless communication method 30 as shown in FIG. 3. FIG. 3 illustrates a flowchart of a wireless communication method 30 according to an embodiment of the present disclosure. The wireless communication method 30 is for a physical resource unit in a full duplex mode corresponding to one Transmission Time Interval (TTI), and the physical resource unit is assigned with uplink and downlink signals to be transmitted in a TTI.

Here, the physical resource unit may be one or more PRBs, that is to say, one or more PRBs may be transmitted in one TTI. Hereinafter, for convenience of explanation, it is assumed that one PRB is transmitted in one TTI as shown in FIG. 2, however, the present disclosure is not limited thereto. As shown in FIG. 2, PRB 201 is assigned with uplink signals (as shown in block 201") and downlink signals (as shown in block 201'), that is, is in a full duplex mode. The wireless communication method 30 shown in FIG. 3 may be used for PRB 201 for example.

As shown in FIG. 3, the wireless communication method 30 starts at step S301 in which at least one of a first processing and a second processing is performed on at least the downlink signals of uplink and downlink signals before transmission. Then, at step S302, the downlink signals are transmitted on the physical resource unit in a TTI from a base station and the uplink signals is transmitted on the physical resource unit in the TTI from a user equipment. After step S302, the wireless communication method 30 ends.

Specifically, "at least the downlink signals of uplink and downlink signals" means that it is possible to perform processing on only downlink signals or on both uplink and downlink signals at step S301 before transmission of step S302 depending on different situations. This will be discussed in detail later. In addition, "at least one of a first processing and a second processing" means that it is possible to perform only the first processing, only the second processing, or both the first processing and the second processing on the at least downlink signals at step S301. These three cases will also be discussed in detail later.

In the wireless communication method 30, the first processing is used to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal.

Specifically, as described above for "at least the downlink signals of uplink and downlink signals" in step S301, "at least part of collided resource elements" means that it is possible to apply CDM between the downlink signal and the uplink signal assigned on each of only part or all of the collided resource elements depending on different situations. Here, a collided resource element refers to a RE that a RS collision (either a RS-RS collision or a RS-data collision) occurs as described hereinabove. That is to say, CDM is applied between the downlink signal and the uplink signal assigned on a RE that a RS collision occurs (e.g. REs 2011, 2012, 2013 in FIG. 2). Thus, the interference on the reference signal can be reduced. Hereinafter, the first processing is also called as CDM (processing).

Also, in the wireless communication method 30, the second processing comprises suppressing at least part of the downlink signals assigned on at least resource elements assigned with uplink reference signals thereon in the collided resource elements.

Firstly, the "at least part of the downlink signals" means that it is possible to suppress part or all of the downlink signals assigned on resource elements assigned with uplink reference signals thereon in the collided resource elements depending on different situations. This will be discussed in detail later. Secondly, "at least resource elements assigned with uplink reference signals" means that it is possible to perform processing on only resource elements assigned with uplink reference signals thereon or on both resource elements assigned with uplink reference signals and resource elements assigned with downlink reference signals depending on different situations. This will also be discussed in detail later. By suppressing the downlink signals, the uplink reference signals are protected since the interference on the uplink reference signals from the downlink signals is reduced. Hereinafter, the second processing is also called as signal suppression (processing).

With the wireless communication method 30, by performing the first processing (CDM) or the second processing (signal suppression) or the combination of them, the interference on reference signals between UL and DL channels in full-duplex communication can be reduced, thus improving the demodulation/channel estimation performance and maintaining a high spectrum efficiency.

According to an embodiment of the present disclosure, in the wireless communication method 30 as shown in FIG. 3, the first processing or the second processing is different depending on whether the uplink signals and the downlink signals are for a same user equipment or different user equipments.

Figure 4:
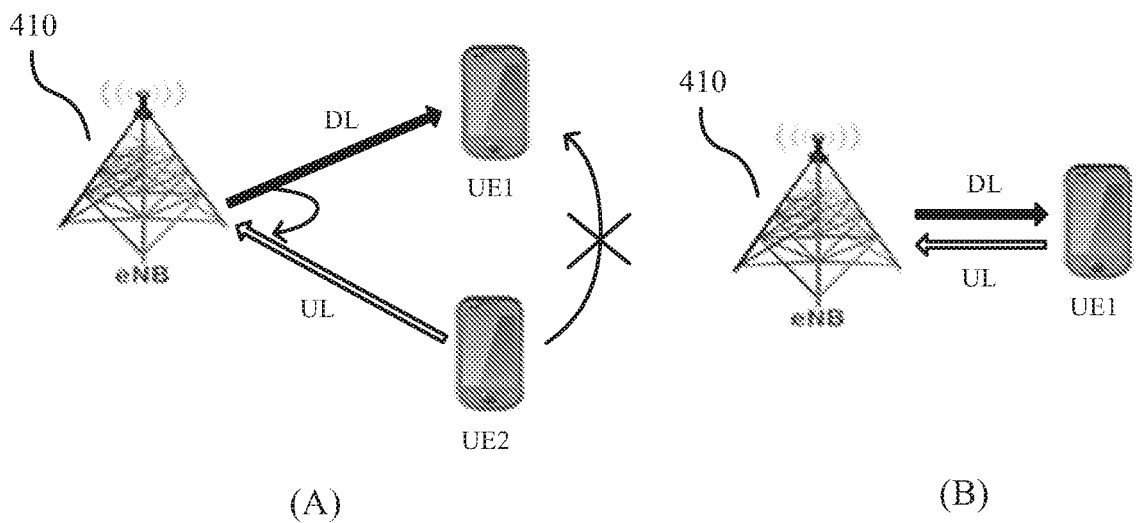
FIG. 4 schematically illustrates cases that UL signals and DL signals are for a same UE or for different UEs in full-duplex communication.

For convenience of understanding, FIG. 4 schematically illustrates cases that UL signals and DL signals are for a same UE or for different UEs in full-duplex communication. Specifically, FIG. 4(A) shows a case that UL signals and DL signals are for different UEs and FIG. 4(B) shows a case that UL signals and DL signals are for a same UE.

Firstly, as shown in FIG. 4(A), eNB (base station) 410 transmits DL signals on a full-duplex PRB to UE1 (denoted by the solid arrow) and UE2 transmits UL signals to eNB 410 on the full-duplex PRB (denoted by the hollow arrow). In such a case, at eNB 410 side, since the transmitting power for DL signals is much larger than the received power for UL signals from UE2, the reception of UL signals will be heavily impacted by DL signals, that is, the interference on UL RSs will be large. At UE1 side, since the distance separation between UE1 and UE2, UL signals from UE2 will not impact the reception of DL RSs from eNB 410. Thus, for the case shown in FIG. 4(A), only UL RSs needs to be protected, that is, only the interference on UL RSs needs to be reduced.

Secondly, as shown in FIG. 4(B), eNB 410 transmits DL signals on a full-duplex PRB to UE1 (denoted by the solid arrow) and UE1 transmits UL signals to eNB 410 on the full-duplex PRB (denoted by the hollow arrow). In such a case, at eNB 410 side, similarly with the case shown in FIG. 4(A), since the transmitting power for DL signals is much larger than the received power for UL signals from UE1, the reception of UL signals will be heavily impacted by DL signals, that is, the interference on UL RSs will be large. At UE1 side, since the transmitting power for UL signals is much larger than the received power for DL signals from eNB 410, the reception of DL signals will be heavily impacted by UL signals, that is, the interference on DL RSs will be large. Thus, for the case shown in FIG. 4(B), both UL RSs and DL RSs need to be protected, that is, both the interference on UL RSs and the interference on DL RSs need to be reduced.

In short, no matter whether UL signals and DL signals are for a same UE or different UEs, the reception of UL signals will be heavily impacted by DL signals. Thus, UL RSs always need to be protected. In contrast, only when UL signals and DL signals are for a same UE, the reception of DL signals will be heavily impacted by UL signals and at this time DL RSs need to be protected. Therefore, for the two different cases shown in FIG. 4, the first processing or the second processing is different. In the following, the first processing (CDM) is discussed in detail by way of examples at first.

According to an embodiment of the present disclosure, in the wireless communication method 30 as shown in FIG. 3, the uplink signals and the downlink signals are for different user equipments, and the at least part of collided resource elements is only the resource elements assigned with uplink reference signals thereon in the collided resource elements. And, the first processing comprises: grouping the resource elements assigned with uplink reference signals thereon in the collided resource elements into at least one group; and for each group, applying one of a pair of orthogonal codes to the downlink signals assigned on the resource elements of the group, and applying the other of the pair of orthogonal codes to the uplink reference signals assigned on the resource elements of the group. Specifically, this corresponds to the case shown in FIG. 4(A) in which only UL RSs need to be protected as described above. Thus, it needs to apply CDM to only collided REs assigned with UL RSs thereon so as to reduce the interference on UL RSs. The grouping and the application of orthogonal codes will be discussed in detail by way of examples later.

According to an embodiment of the present disclosure, in the wireless communication method 30 as shown in FIG. 3, the uplink signals and the downlink signals are for a same user equipment, and the at least part of collided resource elements is all of the collided resource elements. And, the first processing comprises: grouping the resource elements assigned with uplink reference signals thereon in the collided resource elements into at least one group, and for each group, applying one of a pair of orthogonal codes to the downlink signals assigned on the resource elements of the group, and applying the other of the pair of orthogonal codes to the uplink reference signals assigned on the resource elements of the group; and grouping the resource elements assigned with only downlink reference signals of uplink and downlink reference signals thereon in the collided resource elements into at least one group, and for each group, applying the one of the pair of orthogonal codes to the downlink reference signals assigned on the resource elements of the group, and applying the other of the pair of orthogonal codes is applied to the uplink signals assigned on the resource elements of the group. Specifically, this corresponds to the case shown in FIG. 4(B) in which both UL RSs and DL RSs need to be protected as described above. Thus, it needs to apply CDM to both collided REs assigned with UL RSs thereon and collided REs assigned with DL RSs thereon so as to reduce the interference on UL and DL RSs. The grouping and the application of orthogonal codes will also be discussed in detail by way of examples later.

Additionally, according to an embodiment of the present disclosure, in the wireless communication method 30 as shown in FIG. 3, grouping the resource elements is based on at least one of the positions of the resource elements in the physical resource unit and the types of the reference signals assigned on the resource elements. In the following, several examples will be given to illustrate different ways of grouping collided REs in detail.

Figure 5:
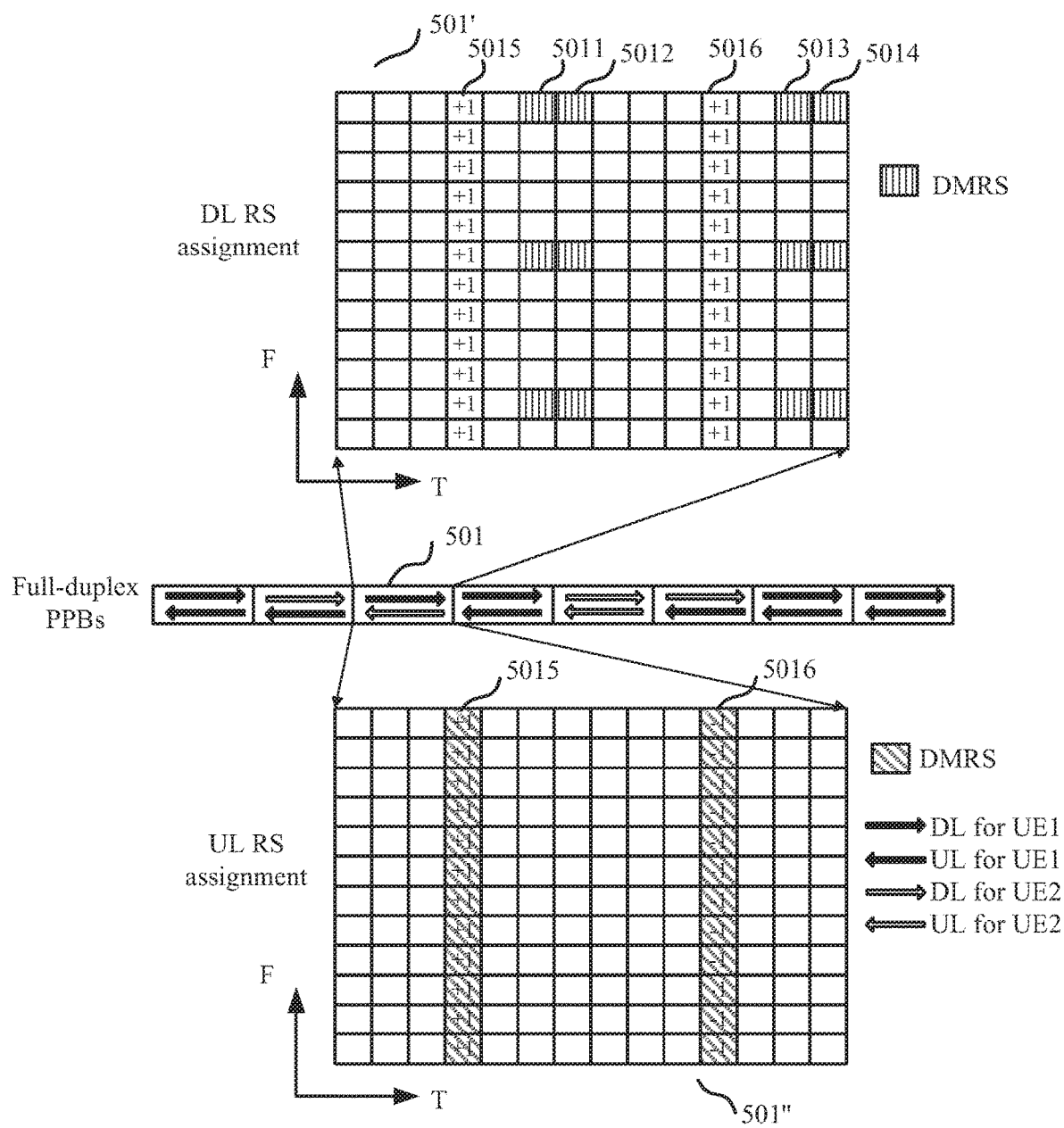
FIG. 5 schematically illustrates an example of performing CDM processing in full-duplex communication.

FIG. 5 schematically illustrates an example of performing CDM processing in full-duplex communication. As shown in FIG. 5, similarly with FIG. 2, PRB 501 is assumed to be a full-duplex PRB in which both UL and DL channels are assigned. And, it is assumed that PRB 501 has a LTE frame structure and LTE RS assignments are taken as an example here. For example, the upper block 501' shows DL RS assignment while the lower block 501" shows UL RS assignment. It is noted that blocks 501' and 501" are both equivalent to the PRB 501 and each small square in blocks 501' and 501" represents a RE.

In this example, only DMRS is assumed here for simplification. Specifically, REs assigned with DL DMRSs thereon are indicated by small squares filled with vertical lines (e.g. REs 5011, 5012, 5013 and 5014) in the upper block 501' while REs assigned with UL DMRSs thereon are indicated by small squares filled with left oblique lines (e.g. REs 5015 and 5016) in the lower block 501". Remaining blank small squares represent REs assigned with data thereon in blocks 501' and 501".

Also, as shown in PRB 501, the solid arrow pointing right means that DL signals assigned on this PRB is for UE1 while the hollow arrow pointing left means that UL signals assigned on this PRB is for UE2. That is to say, this example corresponds to the case shown in FIG. 4(A) in which only UL RSs need to be protected as described above.

According to an embodiment of the present disclosure, in the wireless communication method 30 as shown in FIG. 3, the first processing comprises: for each frequency resource unit in the physical resource unit, grouping the resource elements assigned with uplink reference signals thereon into at least one group, each group comprising N nearest resource elements on time domain and N being an integer which is greater than 1; and for each group, applying the one of the pair of orthogonal codes to the downlink signals assigned on the resource elements of the group, and applying the other of the pair of orthogonal codes to the uplink reference signals assigned on the resource elements of the group, the length of each orthogonal code of the pair of orthogonal codes being equal to N.

Specifically, as shown in FIG. 5, collided REs are REs assigned with UL DMRSs, that is, small squares filled with left oblique lines in block 501" and corresponding small squares in block 501'. Thus, CDM should be applied to these REs. More specifically, in FIG. 5, CDM is applied on time domain, that is, grouping the collided REs on time domain. For example, in block 501", the first row of small squares corresponds to one frequency resource unit in the PRB 501. For example, the collided REs 5015, 5016 in this frequency resource unit are grouped into one group, that is, N=2. Here, for example, the pair of orthogonal codes are Length-2 Walsh-codes {+1, +1} and {+1, −1}. As shown in FIG. 5, {+1, −1} are applied to UL signals (i.e. UL DMRSs) assigned on REs 5015 and 5016 in block 501" as shown by numbers in the REs, while {+1, +1} are applied to DL signals (i.e. DL data signals) assigned on REs 5015 and 5016 in block 501' as shown by numbers in the REs. Similarly, similar CDM processing is performed for other frequency resource units in the PRB 501. Thus, UL DMRSs are protected by the CDM processing, and thus the demodulation/channel estimation performance is improved and the high spectrum efficiency is kept.

Figure 6:
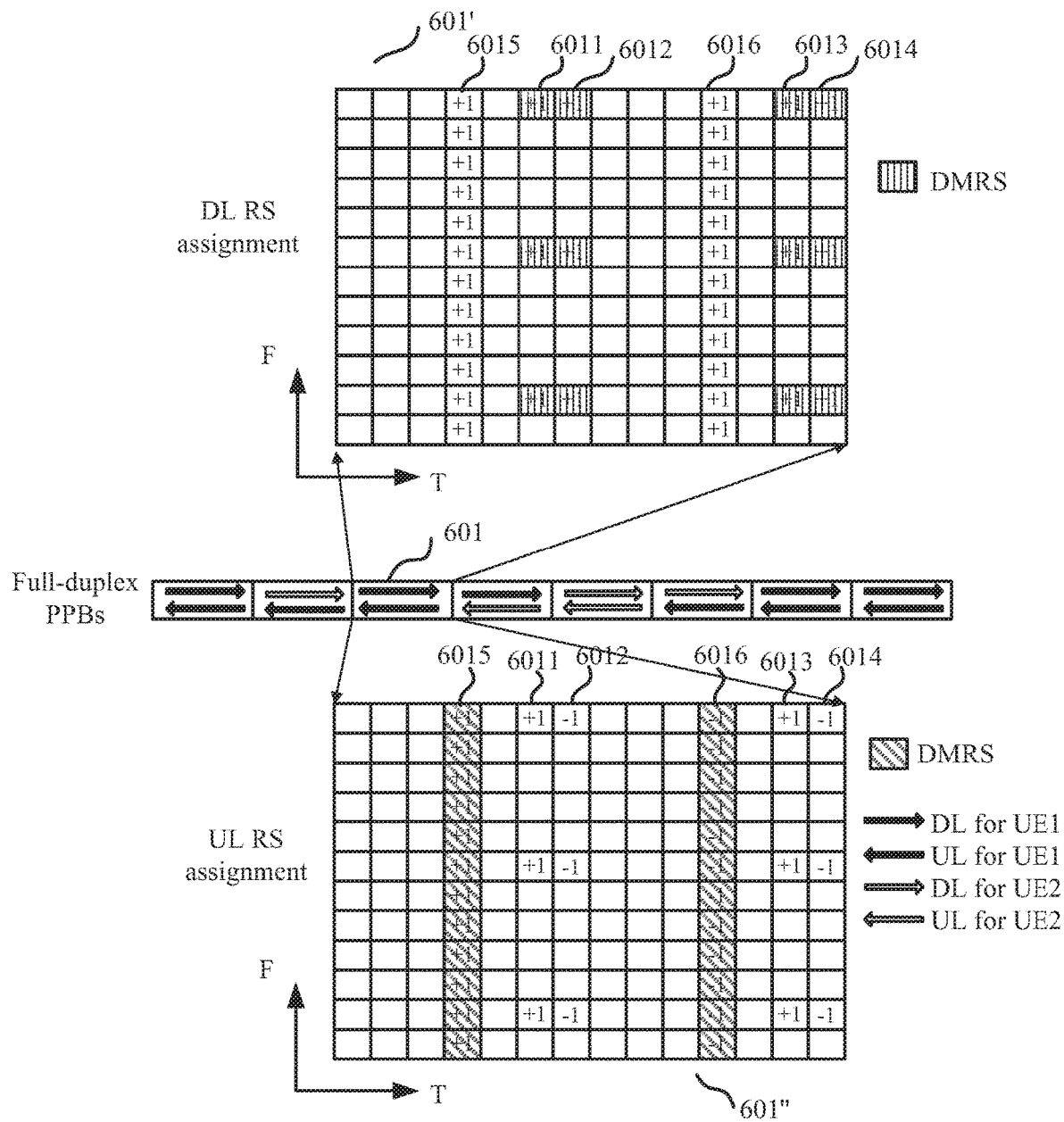
FIG. 6 schematically illustrates another example of performing CDM processing in full-duplex communication.

FIG. 6 schematically illustrates another example of performing CDM processing in full-duplex communication. As shown in FIG. 6, similarly with FIG. 5, PRB 601 is assumed to be a full-duplex PRB in which both UL and DL channels are assigned. And, it is assumed that PRB 601 has a LTE frame structure and LTE RS assignments are taken as an example here. For example, the upper block 601' shows DL RS assignment while the lower block 601" shows UL RS assignment. It is noted that blocks 601' and 601" are both equivalent to the PRB 601 and each small square in blocks 601' and 601" represents a RE. In this example, also only DMRS is assumed here for simplification. Specifically, REs assigned with DL DMRSs thereon are indicated by small squares filled with vertical lines (e.g. REs 6011, 6012, 6013 and 6014) in the upper block 601' while REs assigned with UL DMRSs thereon are indicated by small squares filled with left oblique lines (e.g. REs 6015 and 6016) in the lower block 601". Remaining blank small squares represent REs assigned with data thereon in blocks 601' and 601".

The positions of UL and DL DMRSs in FIG. 6 are same with those in FIG. 5. The difference from FIG. 5 is that: as shown in PRB 601, the solid arrow pointing right means that DL signals assigned on this PRB is for UE1 while the solid arrow pointing left means that UL signals assigned on this PRB is also for UE1. That is to say, this example corresponds to the case shown in FIG. 4(B) in which both UL RSs and DL RSs need to be protected as described above.

According to an embodiment of the present disclosure, in the wireless communication method 30 as shown in FIG. 3, the first processing further comprises: for each frequency resource unit in the physical resource unit, grouping the resource elements assigned with only downlink reference signals of uplink and downlink reference signals thereon into at least one group, wherein each group comprises N nearest resource elements on time domain; and for each group, applying the one of the pair of orthogonal codes to the downlink reference signals assigned on the resource elements of the group, and applying the other of the pair of orthogonal codes to the uplink signals assigned on the resource elements of the group.

Specifically, since both UL RSs and DL RSs need to be protected in the example of FIG. 6, in addition to performing the CDM processing on collided REs assigned with UL DMRSs, the CDM processing is also needed to be performed on collided REs assigned with DL DMRSs. More specifically, the CDM processing on collided REs assigned with UL DMRSs in FIG. 6 is the same as that in FIG. 5. For example, for the first row of REs in 601, {+1, −1} are applied to UL signals (i.e. UL DMRSs) assigned on REs 6015 and 6016 in block 601" while {+1, +1} are applied to DL signals (i.e. DL data signals) assigned on REs 6015 and 6016 in block 601'. In addition, as shown in block 601' in FIG. 6, for the frequency resource unit corresponding to the first row of REs, there are four collided REs assigned with DL DMRSs thereon, that is, REs 6011, 6012, 6013 and 6014. These REs are grouped into two groups with each group including two nearest REs (N=2). That is, the first group includes REs 6011 and 6012 and the second group includes REs 6013 and 6014. Then, for the first group, {+1, +1} are applied to DL signals (i.e. DL DMRSs) assigned on REs 6011 and 6012 in block 601' while {+1, −1} are applied to UL signals (i.e. UL data signals) assigned on REs 6011 and 6012 in block 601". Similarly, for the second group, {+1, +1} are applied to DL signals (i.e. DL DMRSs) assigned on REs 6013 and 6014 in block 601' while {+1, −1} are applied to UL signals (i.e. UL data signals) assigned on REs 6013 and 6014 in block 601". Similarly, similar CDM processing is performed for other frequency resource units in the PRB 601.

Although there is no RE assigned with both a DL DMRS and an UL DMRS in the examples shown in FIGS. 5 and 6, a RE may be assigned with both an UL RS and a DL RS (as shown in other examples discussed later). Thus, in order to avoid applying different orthogonal codes to this kind of RE in two times, for example, after the collided REs assigned with UL RSs are grouped to be performed the CDM processing, the collided REs assigned with only DL RS of UL RSs and DL RSs needs to be grouped to be performed CDM processing since collided REs assigned with both UL RSs and DL RSs have been included in the collided REs assigned with UL RSs and been performed the CDM processing. However, the present disclosure is not limited thereto. If a RE assigned with both an UL RS and a DL RS thereon are applied with a same orthogonal code during the CDM processing on collided REs assigned with UL RSs and the CDM processing on collided REs assigned with DL RSs, there is no need to treat a RE assigned with both an UL RS and a DL RS thereon differently as described above. It is also noted that, the order of performing CDM processing on the collided REs assigned with UL RSs and performing CDM processing on the collided REs assigned with DL RSs is not limited in the present disclosure, and they can be simultaneously in essence.

It is noted that RSs assigned on two REs applied with one of {+1, +1} and {+1, −1} should use same modulation symbols to assure that they can be demodulated successfully. However, this will increase extra overhead. Thus, in order to cancel the extra overhead, one of alternative approaches is to make the two REs adjacent to REs assigned with data signals, and to expand two different symbols to the adjacent two REs assigned with data signals when the RSs assigned on the two REs use the two different symbols. Other alternative approaches may be performing CDM on frequency domain or code domain.

Figure 7:
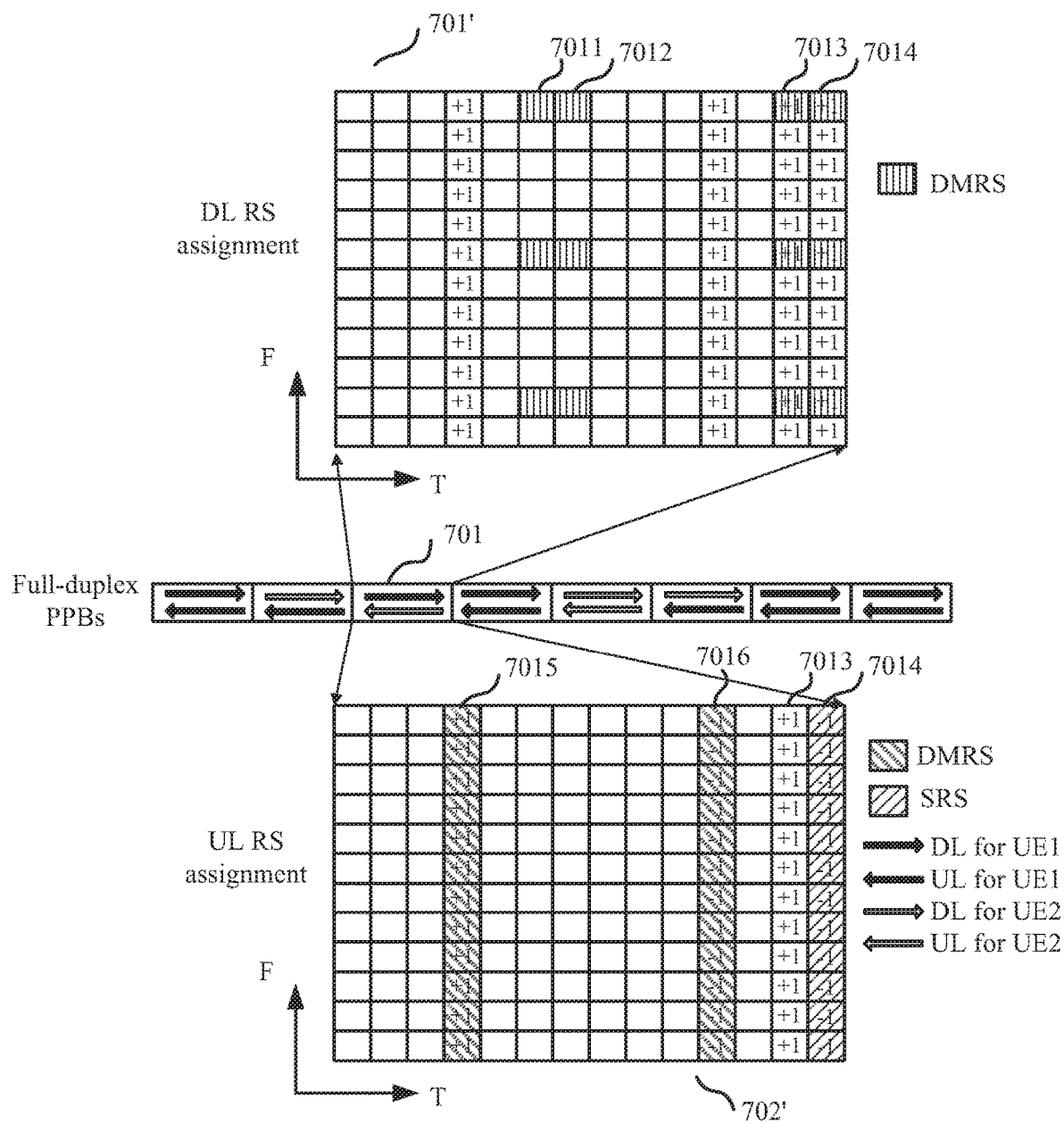
FIG. 7 schematically illustrates a further example of performing CDM processing in full-duplex communication.

FIG. 7 schematically illustrates a further example of performing CDM processing in full-duplex communication. The example shown in FIG. 7 is an extension to the example shown in FIG. 5. Specifically, the example of FIG. 7 also corresponds to the case shown in FIG. 4(A) in which only UL RSs need to be protected as described above. The similar contents with those in FIG. 5 will not be described here in order to avoid redundancy. The difference from FIG. 5 is that there is additionally another type of UL RSs, that is, UL SRSs (as shown in small squares filled with right oblique lines in the block 702'), in FIG. 7. In this example, for each of frequency resource unit (for example, the frequency resource unit corresponding to the first row of REs in PRB 701), three collided REs assigned with UL RSs (UL DMRSs or UL SRSs) thereon, i.e. REs 7015, 7016 and 7014, need to be grouped to be performed the CDM processing. However, if it is assumed that Length-2 Walsh-codes {+1, +1} and {+1, −1} are still to be used for the CDM processing (i.e. N=2), since the number of these three REs is not a multiple of N, it fails to employ the CDM processing used for FIG. 5 to FIG. 7.

In this case, according to an embodiment of the present disclosure, in the wireless communication method 30 as shown in FIG. 3, the first processing comprises: for each frequency resource unit in the physical resource unit, grouping the resource elements assigned with uplink reference signals thereon into a plurality of groups, with one group comprising M nearest resource elements on time domain and each of remaining groups comprising N nearest resource elements on time domain, N being an integer which is greater than 1 and M being an integer which is greater than 0 and less than N; for each of the remaining groups, applying the one of the pair of orthogonal codes to the downlink signals assigned on the resource elements of the group, and applying the other of the pair of orthogonal codes to the uplink reference signals assigned on the resource elements of the group, with the length of each orthogonal code of the pair of orthogonal codes being equal to N; and for said one group, applying the one of the pair of orthogonal codes to the downlink signals assigned on the M resource elements of said one group and N-M resource elements adjacent to the M resource elements on the time domain, and applying the other of the pair of orthogonal codes to the uplink reference signals assigned on the M resource elements of said one group and uplink signals assigned on said N-M resource elements adjacent to the M resource elements on the time domain.

Specifically, as shown in FIG. 7, the REs 7015, 7016 and 7014 are grouped into two groups, that is, the first group includes REs 7015 and 7016 and the second group includes RE 7014 (i.e. M=1). For the first group, {+1, −1} are applied to UL DMRSs assigned on the two REs 7015 and 7016 as shown in block 701", meanwhile {+1, +1} are applied to DL data signals assigned on the two REs 7015 and 7016 as shown in block 701'. For the second group, the RE 7014 may be grouped with its adjacent RE 7013 assigned with UL data signal thereon. That is to say, {+1, −1} are applied to UL SRS assigned on the RE 7014 and UL data signal assigned on the RE 7013 adjacent to the RE 7014 as shown in block 701", meanwhile {+1, +1} are applied to DL signals assigned on the RE 7014 and the RE 7013 adjacent to the RE 7014 as shown in block 701'. Thus, an orthogonal code ({+1, +1} or {+1, −1}) can be applied to not only RSs but also a data signal and a RS.

Although not shown in the figure, the above embodiment may also extend to the case shown in FIG. 4(B) in which both UL RSs and DL RSs need to be protected as described above. For example, when the number of collided REs assigned with DL RSs is not a multiple of N, adjacent REs assigned with DL data signals may be grouped together to be performed the CDM processing.

According to an embodiment of the present disclosure, in the wireless communication method 30 as shown in FIG. 3, the first processing further comprises: for each frequency resource unit in the physical resource unit, grouping the resource elements assigned with only downlink reference signals of uplink and downlink reference signals into a plurality of groups, with one group comprising P nearest resource elements on time domain and each of remaining groups comprising N nearest resource elements on time domain, P being an integer which is greater than 0 and less than N; for each of the remaining groups, applying the one of the pair of orthogonal codes to the downlink reference signals assigned on the resource elements of the group, and applying the other of the pair of orthogonal codes to the uplink signals assigned on the resource elements of the group; and for said one group, applying the one of the pair of orthogonal codes to the downlink reference signals assigned on the P resource elements of said one group and downlink signals assigned on N-P resource elements adjacent to the P resource elements on the time domain, and applying the other of the pair of orthogonal codes to the uplink signals assigned on the P resource elements of said one group and said N-P resource elements adjacent to the P resource elements on the time domain. The above further steps correspond to the CDM processing performed on collided REs assigned with only DL RSs when the number of the collided REs assigned with only DL RSs is not a multiple of N.

Figure 8:
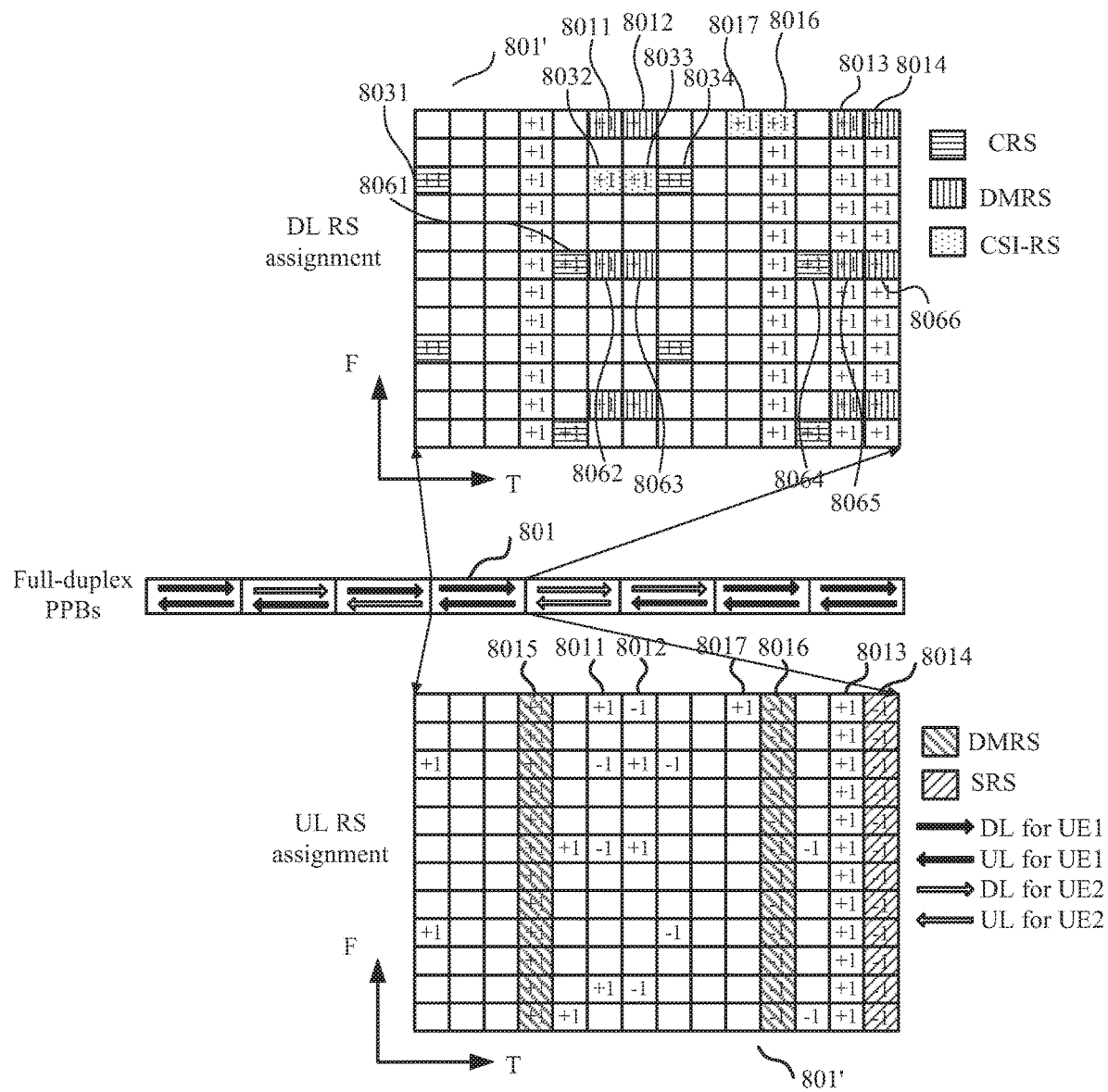
FIG. 8 schematically illustrates another example of performing CDM processing in full-duplex communication.

FIG. 8 schematically illustrates another example of performing CDM processing in full-duplex communication. The example shown in FIG. 8 is an extension to the example shown in FIG. 7 and shows a more complicated case than that in FIG. 7. Firstly, the example of FIG. 7 corresponds to the case shown in FIG. 4(A) in which only UL RSs need to be protected as described above, while the example of FIG. 8 corresponds to the case shown in FIG. 4(B) in which both UL RSs and DL RSs need to be protected as described above, as shown by solid arrows pointing left and right in PRB 801 in FIG. 8. Secondly, in FIG. 7 there is only one type of DL RSs (i.e. DL DMRSs) while there are three types of DL RSs in FIG. 8. Specifically, as shown in FIG. 8, similarly with FIG. 2, REs assigned with DL CRSs thereon are indicated by small squares filled with horizontal lines in the block 801', and REs assigned with DL CSI-RSs thereon are indicated by small squares filled with points in the block 801'. Furthermore, the positions of REs assigned with UL DMRSs and UL SRSs in FIG. 8 are same as those in FIG. 7 and the way of grouping them and the CDM processing performed thereon are same as those in FIG. 7, and thus the details thereof will not be described here in order to avoid redundancy.

More specifically, as shown in FIG. 8, for each frequency resource unit in PRB 801, grouping the REs assigned with DL RSs thereon into at least one group, with each group comprising 2 nearest REs on time domain. Then, for each group, {+1, +1} is applied to the DL RSs assigned on the REs of the group as shown in the block 801', and {+1, −1} is applied to the UL signals assigned on the REs of the group as shown in the block 801".

It is noted that, for the frequency resource unit corresponding to the third row of REs in the block 801', REs 8031 and 8034 are assigned with DL CRSs and REs 8032 and 8033 are assigned with DL CSI-RSs. According to the above steps, nearest REs 8031 and 8032 are grouped into one group while nearest REs 8033 and 8034 are grouped into one group. Similarly, for the frequency resource unit corresponding to the sixth row of REs in the block 801', REs 8061 and 8064 are assigned with DL CRSs and REs 8062, 8063, 8065 and 8066 are assigned with DL DMRSs. According to the above steps, nearest REs 8061 and 8062 are grouped into one group, nearest REs 8063 and 8064 are grouped into one group and nearest REs 8065 and 8066 are grouped into one group. That is to say, grouping of collided REs is performed based on only their positions in the PRB. Nearest collided REs are grouped into one group no matter what kinds of RS are assigned thereon. However, the present disclosure is not limited thereto and other ways of grouping will be discussed later.

In addition, by taking the frequency resource unit corresponding to the first REs in PRB 801 as an example, RE 8016 is assigned with both a UL DMRS and a DL CSI-RS, and RE 8014 is assigned with both a UL SRS and a DL DMRS. It is found that, when protecting UL RSs, as described for FIG. 7, REs 8015 and 8016 are grouped into one group, and UL DMRSs assigned on these two REs are applied with {+1, −1} as shown in the block 801" and DL data signals assigned on RE 8015 and DL CSI-RS assigned on RE 8016 are applied with {+1, +1} as shown in the block 801'. Similarly, UL data signal assigned on RE 8013 and UL SRS assigned on RE 8014 are applied with {+1, −1} as shown in the block 801" and DL DMRSs assigned on these two REs are applied with {+1, +1} as shown in the block 801'. When protecting DL RSs, as shown in FIG. 8, REs 8011 and 8012 are grouped into one group, REs 8017 and 8016 are grouped into one group and REs 8013 and 8014 are grouped into one group. Then, DL DMRSs assigned on REs 8011 and 8012 are applied with {+1, +1} as shown in the block 801' and UL data signals assigned on these two REs are applied with {+1, −1} as shown in the block 801". DL CSI-RSs assigned on REs 8017 and 8016 are applied with {+1, +1} as shown in the block 801' and UL data signal assigned on RE 8017 and UL DMRS assigned on RE 8016 are applied with {+1, −1} as shown in the block 801". DL DMRSs assigned on REs 8013 and 8014 are applied with {+1, +1} as shown in the block 801' and UL data signal assigned on RE 8013 and UL SRS assigned on RE 8014 are applied with {+1, −1} as shown in the block 801".

It can be seen from the above that RE 8016 which is assigned both UL and DL RSs is assigned with a same orthogonal code, that is, is performed a same CDM processing, when protecting UL RSs and when protecting DL RSs. And it is also the case for RE 8014. In this case, there is no need to make such REs be grouped only once (and be performed CDM processing only once) (i.e. when protecting UL RSs or when protecting DL RSs). That is to say, the way of grouping collided REs to perform the CDM processing thereon may be different depending on specific situations and does not limit the present disclosure.

Although in examples given in FIGS. 5-8, grouping of collided REs is based on only positions of REs in the PRB, the present disclosure is not limited thereto. And, grouping of collided REs may also be based on both types of RSs assigned on the REs and positions of the RES in the PRB.

According to an embodiment of the present disclosure, in the wireless communication method 30 as shown in FIG. 3, the uplink signals received on the physical resource unit comprises a plurality of types of uplink reference signals. And, for each type of the uplink reference signals, the first processing comprises: for each frequency resource unit in the physical resource unit, grouping the resource elements assigned with the type of uplink reference signals thereon into at least one group, with each group comprising N nearest resource elements on time domain, N being an integer which is greater than 1; and for each group, applying the one of the pair of orthogonal codes to downlink signals assigned on the resource element of the group, and applying the other of the pair of orthogonal codes to the type of uplink reference signals assigned on the resource elements of the group, with the length of each orthogonal code of the pair orthogonal codes being equal to N. Specifically, this corresponds to the case shown in FIG. 4(A) in which only UL RSs need to be protected as described above. And, for each type of UL RSs, the collided REs assigned with the type of UL RS are grouped and performed the CDM processing as above. In addition, it is assumed that the number of the collided RE to be grouped is a multiple of N in this case.

According to an embodiment of the present disclosure, in the wireless communication method 30 as shown in FIG. 3, the uplink signals received on the physical resource unit comprises a plurality of types of uplink reference signals. And, for each type of the uplink reference signals, the first processing comprises: for each frequency resource unit in the physical resource unit, grouping the resource elements assigned with the type of uplink reference signals into a plurality of groups, with one group comprising M nearest resource elements on time domain and each of remaining groups comprising N nearest resource elements on time domain, N being an integer which is greater than 1 and M being an integer which is greater than 0 and less than N; for each of the remaining groups, applying the one of the pair of orthogonal codes to downlink signals assigned on the resource element of the group, and applying the other of the pair of orthogonal codes to the type of uplink reference signals assigned on the resource elements of the group; and for said one group, applying the one of the pair of orthogonal codes to downlink signals assigned on the M resource elements of said one group and N-M resource elements adjacent to the M resource elements on the time domain, and applying the other of the pair of orthogonal codes to the type of uplink reference signals assigned on the M resource elements of said one group and uplink signals assigned on said N-M resource elements adjacent to the M resource elements on the time domain. Specifically, this corresponds to the case shown in FIG. 4(A) in which only UL RSs need to be protected as described above. And, for each type of UL RSs, the collided REs assigned with the type of UL RSs are grouped and performed the CDM processing as above. In addition, it is assumed that the number of the collided RE to be grouped is not a multiple of N in this case.

According to an embodiment of the present disclosure, in the wireless communication method 30 as shown in FIG. 3, the downlink signals transmitted on the physical resource unit comprises a plurality of types of downlink reference signals. And, for each type of the downlink reference signals, the first processing further comprises: for each frequency resource unit in the physical resource unit, grouping the resource elements assigned with the type of downlink reference signals thereon into at least one group, with each group comprising N nearest resource elements on time domain; and for each group, applying the one of the pair of orthogonal codes to the type of downlink reference signals assigned on the resource element of the group, and applying the other of the pair of orthogonal codes to the uplink signals assigned on the resource elements of the group. Specifically, this corresponds to the case shown in FIG. 4(B) in which both UL RSs and DL RSs need to be protected as described above. And, for each type of DL RSs, the collided REs assigned with the type of DL RS are grouped and performed the CDM processing as above. In addition, it is assumed that the number of the collided RE to be grouped is a multiple of N in this case.

According to an embodiment of the present disclosure, in the wireless communication method 30 as shown in FIG. 3, the downlink signals transmitted on the physical resource unit comprises a plurality of types of downlink reference signals. And, for each type of the downlink reference signals, the first processing further comprises: for each frequency resource unit in the physical resource unit, grouping the resource elements assigned with the type of downlink reference signals thereon into a plurality of groups, with one group comprising P nearest resource elements on time domain and each of remaining groups comprising N nearest resource elements on time domain, P being an integer which is greater than 0 and less than N; for each of the remaining groups, applying the one of the pair of orthogonal codes to the type of downlink reference signals assigned on the resource elements of the group, and applying the other of the pair of orthogonal codes to the uplink signals assigned on the resource element of the group; and for said one group, applying the one of the pair of orthogonal codes to the type of downlink reference signals assigned on the P resource elements of said one group and downlink signals assigned on N-P resource elements adjacent to the P resource elements on the time domain, and applying the other of the pair of orthogonal codes to the uplink signals assigned on the P resource elements of said one group and said N-P resource elements adjacent to the P resource elements on the time domain. Specifically, this corresponds to the case shown in FIG. 4(B) in which both UL RSs and DL RSs need to be protected as described above. And, for each type of DL RSs, the collided REs assigned with the type of DL RS are grouped and performed the CDM processing as above. In addition, it is assumed that the number of the collided RE to be grouped is not a multiple of N in this case.

Figure 9:
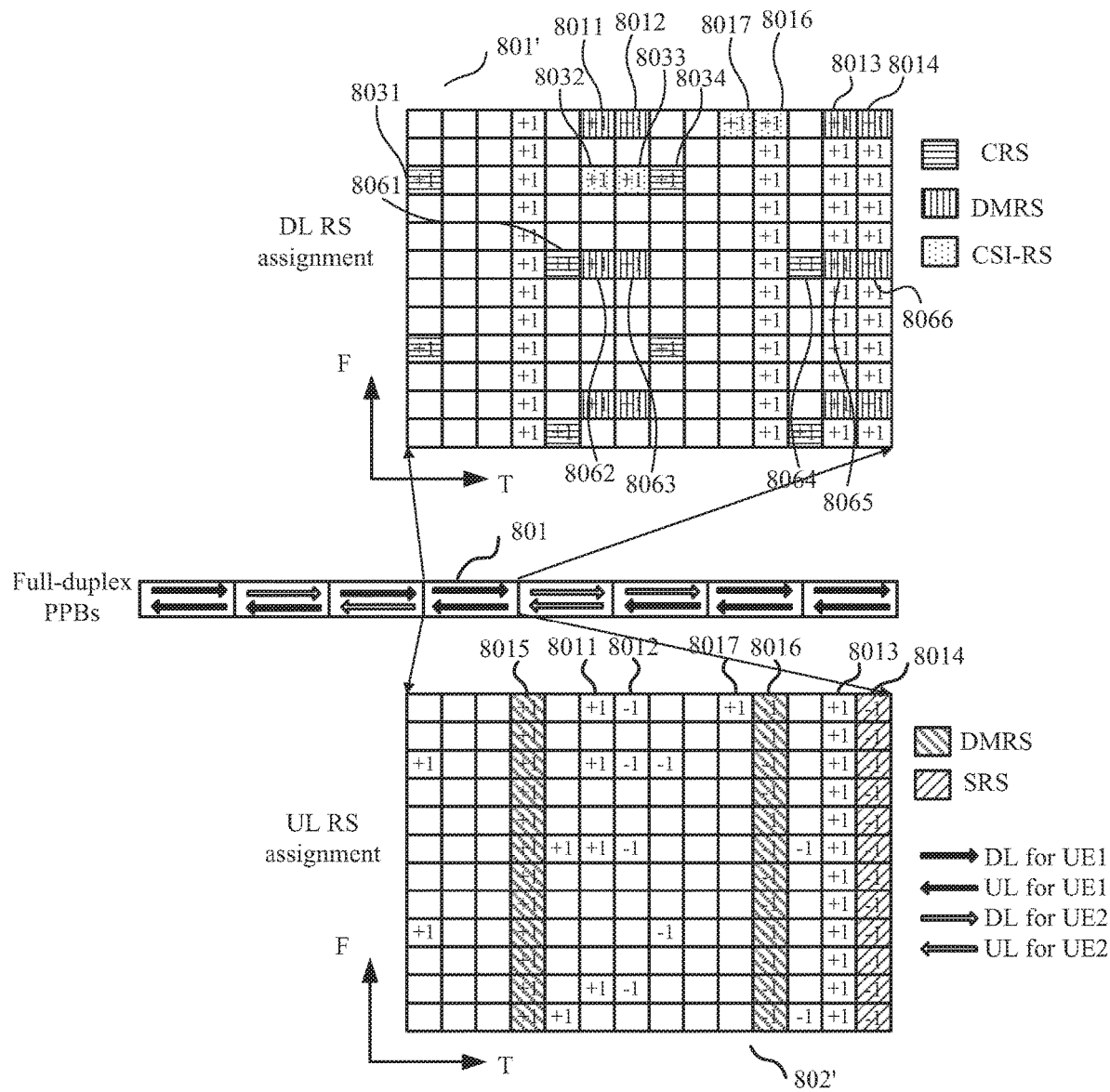
FIG. 9 schematically illustrates another example of performing CDM processing in full-duplex communication.

For convenience of understanding, FIG. 9 further shows a case of grouping collided REs based on both types of RSs assigned on the REs and positions of REs in a PRB. FIG. 9 schematically illustrates another example of performing CDM processing in full-duplex communication. The types of UL RSs and DL RSs assigned on a PRB and their positions are totally same with those shown in FIG. 8, and thus same reference numbers with those in FIG. 8 are used in FIG. 9.

Specifically, as shown in FIG. 9, for the frequency resource unit corresponding to the third row of REs in PRB 801, since there are two kinds of DL RSs, for each type of DL RSs, grouping of collided REs assigned with the type of DL RSs is performed. For example, for DL CRSs, REs 8031 and 8034 assigned with DL CRSs are grouped into one group, and then DL CRSs assigned on these two REs are applied with {+1, +1} as shown in the block 801' and UL data signals assigned on these two REs are applied with {+1, −1} as shown in the block 801". Also, for DL CSI-RSs, REs 8032 and 8033 assigned with DL CSI-RSs are grouped into one group, and then DL CSI-RSs assigned on these two REs are applied with {+1, +1} as shown in the block 801' and UL data signals assigned on these two REs are applied with {+1, −1} as shown in the block 801". By comparing with the example in FIG. 8 in which REs 8031 and 8032 are grouped into one group and REs 8033 and 8034 are grouped into one group, in FIG. 9, REs 8031 and 8034 are grouped into one group and REs 8032 and 8033 are grouped into one group. This is because grouping of collided REs is based on only positions of the REs in the PRB 801 in FIG. 8 while grouping of collided REs is based on both types of RSs assigned on REs and positions of the REs in the PRB 801 in FIG. 9.

For example again, as shown in FIG. 9, for the frequency resource unit corresponding to the sixth row of REs in PRB 801, since there are two kinds of DL RSs, for each type of DL RSs, grouping of collided REs assigned with the type of DL RSs is performed. For example, for DL CRSs, REs 8061 and 8064 assigned with DL CRSs are grouped into one group, and then DL CRSs assigned on these two REs are applied with {+1, +1} as shown in the block 801' and UL data signals assigned on these two REs are applied with {+1, −1} as shown in the block 801". Also, for DL DMRSs, REs 8062, 8063, 8065 and 8066 assigned with DL DMRSs are grouped into two groups, that is, nearest REs 8062 and 8063 are grouped into one group and nearest REs 8065 and 8066 are grouped into one group. And, for the group of REs 8062 and 8063, DL DMRSs assigned on these two REs are applied with {+1, +1} as shown in the block 801' and UL data signals assigned on these two REs are applied with {+1, −1} as shown in the block 801". For the group of REs 8065 and 8066, DL DMRSs assigned on these two REs are applied with {+1, +1} as shown in the block 801' and UL data signal assigned on RE 8065 and UL SRS assigned on RE 8066 are applied with {+1, −1} as shown in the block 801". By comparing with the example in FIG. 8 in which REs 8061 and 8062 are grouped into one group and REs 8063 and 8064 are grouped into one group, in FIG. 9, REs 8061 and 8064 are grouped into one group and REs 8062 and 8063 are grouped into one group. This is also because grouping of collided REs is based on only positions of the REs in the PRB 801 in FIG. 8 while grouping of collided REs is based on both types of RSs assigned on REs and positions of the REs in the PRB 801 in FIG. 9.

Although FIGS. 5-8 shows that grouping of collided REs may be based on positions of REs in the PRB and FIG. 9 shows that grouping of collided REs may be based on both types of RSs assigned on the REs and positions of the REs in the PRB, the present disclosure is not limited thereto. Those skilled in the art may employ any other ways of grouping collided REs to perform the CDM processing according to specific situations. For example, non-adjacent collided REs may also be grouped into one group. Or, for example, in a MIMO (Multiple Input Multiple Output) case, different layers may be grouped into one group.

It is noted that, although examples in FIGS. 5-9 shows that CDM processing is performed on time domain, the present disclosure is not limited thereto. For example, CDM processing may also be performed on frequency domain or code domain. For example, when performing the CDM processing on frequency domain, the first processing may comprises: for each time resource unit in the physical resource unit, grouping the resource elements assigned with uplink reference signals thereon into at least one group, with each group comprising N nearest resource elements on frequency domain, N being an integer which is greater than 1; and for each group, applying the one of the pair of orthogonal codes to the downlink signals assigned on the resource elements of the group, and applying the other of the pair of orthogonal codes to the uplink reference signals assigned on the resource elements of the group, the length of each orthogonal code of the pair of orthogonal codes being equal to N.

It is noted that, since UL or DL signals are transmitted in a unit of one TTI, the first processing (CDM processing) may be varied per TTI when the first processing is performed on time domain. Similarly, the first processing (CDM processing) may be varied per frequency unit in a same TTI when the first processing is performed on frequency domain. The frequency unit may be one PRB, one RBG (Resource Block Group), etc.

It is also noted that, although Length-2 Walsh codes are taken as an example of orthogonal codes for description in the above, the present disclosure is not limited thereto. Those skilled in the art may employ any other kinds of orthogonal codes, and the length of the orthogonal codes is not limited to 2 and may be 3, 4, 8, etc. as long as the length of the orthogonal codes is equal to the number of collided REs in each group. In the above, the first processing (CDM processing) is described by way of examples. With the first processing, the interference on reference signals between UL and DL channels in full-duplex communication can be reduced, thus improving the demodulation/channel estimation performance and maintaining a high spectrum efficiency. In the following, the second processing (signal suppression) will be discussed in detail.

According to an embodiment of the present disclosure, in the wireless communication method 30 as shown in FIG. 3, the uplink signals and the downlink signals are for different user equipments. And, said suppressing at least part of the downlink signals assigned on the resource elements assigned with uplink reference signals thereon in the collided resource elements comprises: suppressing all of the downlink signals assigned on the resource elements assigned with uplink reference signals thereon in the collided resource elements.

Figure 10:
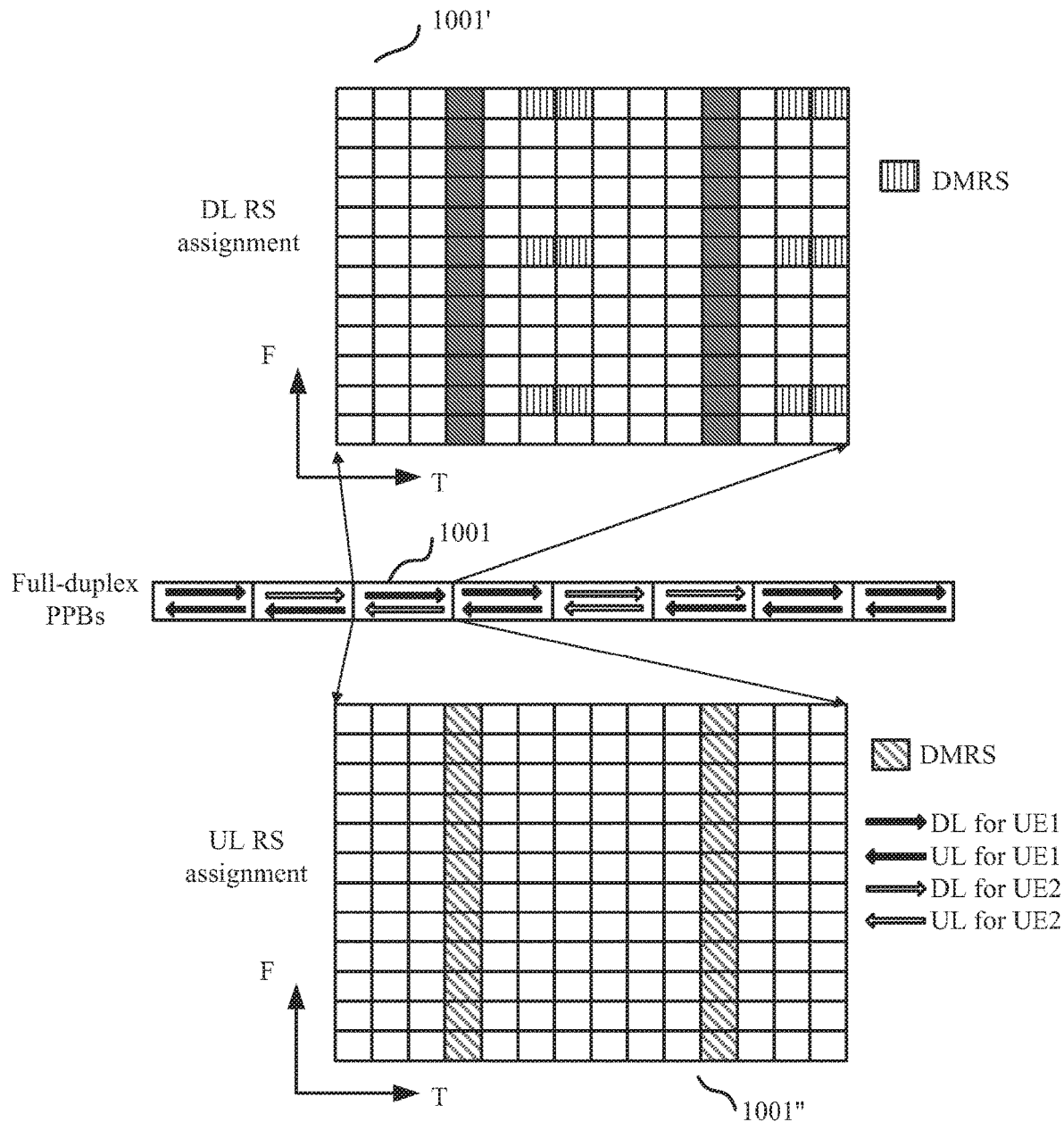
FIG. 10 schematically illustrates an example of performing signal suppression in full-duplex communication.

Specifically, FIG. 10 schematically illustrates an example of performing signal suppression in full-duplex communication. As shown in FIG. 10, similarly with FIG. 5, PRB 1001 is assumed to be a full-duplex PRB in which both UL and DL channels are assigned. And, it is assumed that PRB 1001 has a LTE frame structure and LTE RS assignments are taken as an example here. For example, the upper block 1001' shows DL RS assignment while the lower block 1001" shows UL RS assignment. It is noted that blocks 1001' and 1001" are both equivalent to the PRB 1001 and each small square in blocks 1001' and 1001" represents a RE. In this example, only DMRS is assumed here for simplification. Specifically, REs assigned with DL DMRSs thereon are indicated by small squares filled with vertical lines in upper block 1001' while REs assigned with UL DMRSs thereon are indicated by small squares filled with left oblique lines in lower block 1001". Remaining small squares represent REs assigned with data thereon in blocks 1001' and 1001". Also, as shown in PRB 1001, the solid arrow pointing right means that DL signals assigned on this PRB is for UE1 while the hollow arrow pointing left means that UL signals assigned on this PRB is for UE2. That is to say, this example corresponds to the case shown in FIG. 4(A) in which only UL RSs need to be protected as described above.

In order to reduce interference on UL DMRSs, instead of performing the first processing (CDM processing), the second processing (signal suppression) may also be performed. Specifically, as shown in FIG. 10, UL DMRSs are assigned on REs in the fourth and the eleventh columns of REs from the left hand in the PRB 1001, as shown in the block 1001". In order to protect these UL DMRSs, DL signals assigned on these REs are suppressed, as shown by dark small squares in the block 1001'. Thus, suppressed DL signals will not affect UL DMRSs and UL DMRSs are protected.

According to an embodiment of the present disclosure, in the wireless communication method 30 as shown in FIG. 3, the uplink signals and the downlink signals are a same user equipment. And, said suppressing at least part of the downlink signals assigned on the resource elements assigned with uplink reference signals thereon in the collided resource elements comprises: suppressing the downlink signals assigned on the resource elements assigned with only uplink reference signals of uplink and downlink reference signals thereon in the collided resource elements; suppressing the uplink signals assigned on the resource elements assigned with only downlink reference signals of uplink and downlink reference signals thereon in the collided resource elements; and for each of the resource elements assigned with both downlink and uplink reference signals thereon in the collided resource elements, if the priority of the downlink reference signal assigned on the resource element is lower than that of the uplink reference signal assigned on the resource element, suppressing the downlink reference signal, otherwise suppressing the uplink reference signal.

Figure 11:
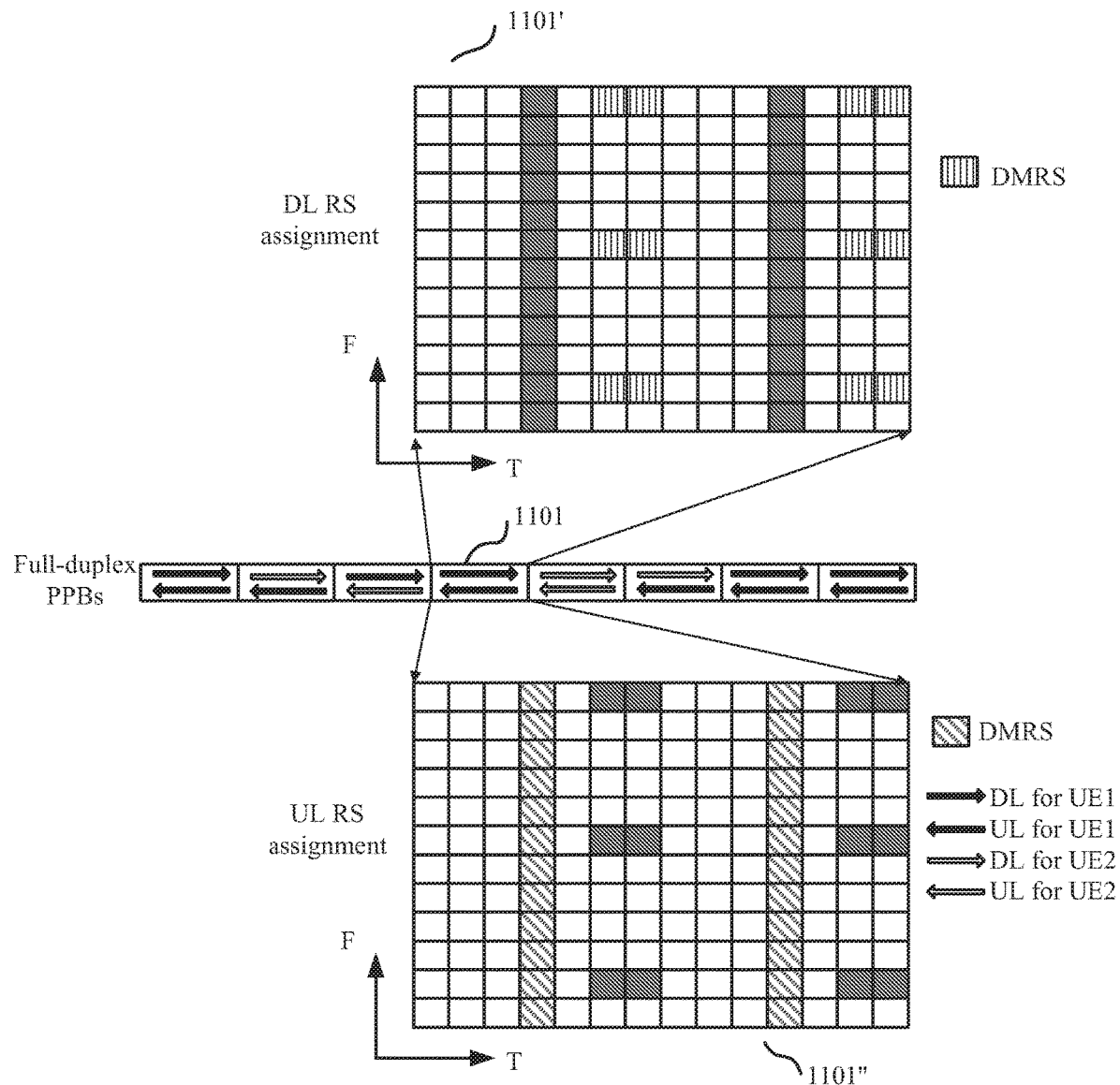
FIG. 11 schematically illustrates another example of performing signal suppression in full-duplex communication.

Specifically, FIG. 11 schematically illustrates another example of performing signal suppression in full-duplex communication. As shown in FIG. 11, similarly with FIG. 10, PRB 1101 is assumed to be a full-duplex PRB in which both UL and DL channels are assigned. And, it is assumed that PRB 1101 has a LTE frame structure and LTE RS assignments are taken as an example here. For example, the upper block 1101' shows DL RS assignment while the lower block 1101" shows UL RS assignment. It is noted that blocks 1101' and 1101" are both equivalent to the PRB 1101 and each small square in blocks 1101' and 1101" represents a RE. In this example, also only DMRS is assumed here for simplification. And, marks for REs assigned with UL DMRSs, DL DMRSs or data signals are same with those in FIG. 10, thus details thereof will not be described here in order to avoid redundancy.

The difference from FIG. 10 is that: as shown in PRB 1101, the solid arrow pointing right means that DL signals assigned on this PRB is for UE1 while the solid arrow pointing left means that UL signals assigned on this PRB is also for UE1. That is to say, this example corresponds to the case shown in FIG. 4(B) in which both UL RSs and DL RSs need to be protected as described above. In this case, in addition to the signal suppression performed in FIG. 10, the UL data signals assigned on REs assigned with DL DMRSs thereon are also suppressed, as shown by dark small squares in the block 1101". Thus, both UL DMRSs and DL DMRSs are to be protected for reception and demodulation.

Specifically, as shown in FIG. 11, similarly with FIG. 10, in order to protect UL DMRSs, DL signals assigned on REs assigned with UL DMRSs are suppressed, as shown by dark small squares in the block 1001'. Thus, suppressed DL signals will not affect UL DMRSs and UL DMRSs are protected. Meanwhile, in order to protect DL DMRSs, UL signals assigned on REs assigned with DL DMRSs are suppressed, as shown by dark small squares in the block 1001". Thus, suppressed UL signals will not affect DL DMRSs and UL DMRSs are protected.

It is noted that although neither FIG. 10 nor FIG. 11 shows any RE assigned with both a UL RS and a DL RS, such RE may present in a more complicated case (for example, as shown in FIGS. 7-9). For a RE assigned with both a UL RS and a DL RS, if the priority of UL RS is lower than DL RS, UL RS is suppressed to protect DL RS. Otherwise, if the priority of UL RS is higher than DL RS, DL RS is suppressed to protect UL RS. It is understood by those skilled in the art that determination of priority of each type of RSs may be based on any suitable factors in specific situations, and the present disclosure is not limited thereto.

In short, in the second processing (signal suppression), for a RS-data collision, the data signal is suppressed to protect the RS, while for a RS-RS collision, less important RS is suppressed to protect more important RS.

According to an embodiment of the present disclosure, in the wireless communication method 30 as shown in FIG. 3, said suppressing is implemented by one of: not allocating said signal on the resource element by rate matching; puncturing said signal on the resource element; reducing the power of said signal on the resource element to zero; reducing the power of said signal on the resource element to a less value.

Specifically, the signal suppression may be realized in the aspect of scheduling. For example, the signal suppression may be performed by puncturing. As shown in FIGS. 10 and 11, dark small squares may represent that data signals assigned on these REs are punctured. Alternatively, the signal suppression may also be performed by rate matching. That is to say, by adjusting the rate, data signals originally assigned on these collided REs (dark small squares in FIGS. 10 and 11) may be reassigned on other REs. It is noted that the difference between this two manners of scheduling is that puncturing will result in the loss of the data signals but rate matching will not. Additionally, the signal suppression may be realized in the aspect of power controlling. For example, the signal suppression may be performed by reducing the power of signals to be suppressed. For example, it is possible to reduce the power of signals to be suppressed to a power level which is low enough to make the interference on RS to be protected negligible. Or even, it is possible to reduce the power of signals to be suppressed to zero to thoroughly cancel the interference on RS to be protected.

It is noted that the above exemplary implementations of the signal suppression are only examples but not limit the present disclosure. Those skilled in the art may employ any other suitable approaches to implement the signal suppression.

According to an embodiment of the present disclosure, in the wireless communication method 30 as shown in FIG. 3, the suppressed signal is further reallocated to another resource element different from said resource element. Specifically, as described above, puncturing will result in the loss of the data signals. In this case, it is possible to reallocate punctured data signals or punctured RSs to other REs in order to make the receiver side still can obtain the data signals or RSs.

According to an embodiment of the present disclosure, in the wireless communication method 30 as shown in FIG. 3, the second processing is varied per TTI. Similarly with the first processing as described above, the second processing may also be varied per TTI since UL or DL signals are transmitted in a unit of one TTI.

It is understood by those skilled in the art that the second processing as described above may also be extended to control case and other signal collision case such as RACH (Random Access Channel), PSS (Primary Synchronous Signal)/SSS (Secondary Synchronous Signal).

With the second processing (signal suppression), the interference on reference signals between UL and DL channels in full-duplex communication can be reduced, thus improving the demodulation/channel estimation performance and maintaining a high spectrum efficiency.

As described above, only the first processing or only the second processing may be performed on collided REs to reduce the interference on RSs. However, the present disclosure is not limited thereto. The first processing and the second processing may be combined in any suitable way to reduce the interference on RSs.

According to an embodiment of the present disclosure, in the wireless communication method 30 as shown in FIG. 3, whether the first processing or the second processing is performed on a collided resource element in the physical resource unit is determined based on the type of reference signals assigned on the collided resource element.

Specifically, taking FIG. 6 (and FIG. 11) as an simple example, it is also possible to perform the first processing on collided REs assigned with UL DMRSs (e.g. REs 5015, 5016, etc) while performing the second processing on collided REs assigned with DL DMRSs (e.g. REs 5011, 5012, 5013, 5014, etc). That is to say, for different types of RSs, different processing may be used.

Figure 12:
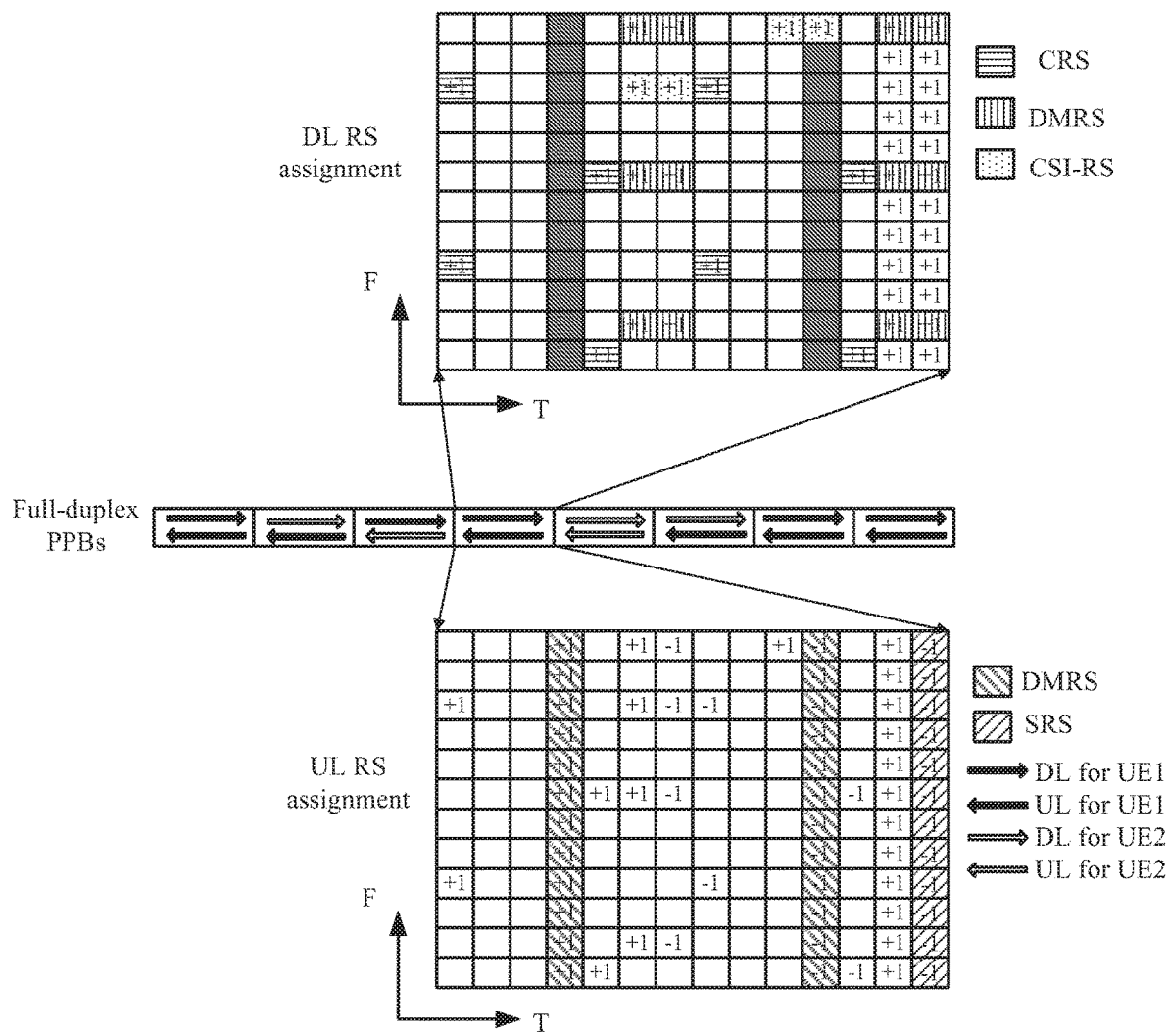
FIG. 12 schematically illustrates an example of combining the CDM processing and the signal suppression in full-duplex communication.

As a more complicated example, FIG. 12 schematically illustrates an example of combining the CDM processing and the signal suppression in full-duplex communication. The DL and UL RS configuration in FIG. 12 is same as those in FIGS. 8 and 9 and thus will not be described again here in order for avoiding redundancy. The difference of FIG. 12 from FIGS. 8 and 9 is that only the first processing is performed in FIGS. 8 and 9 while both the first processing and the second processing are used in combination in FIG. 12. Specifically, as shown in FIG. 12, the first processing is performed for DL CRSs, DL DMRSs, DL CSI-RSs and UL SRSs, while the second processing is performed for UL DMRSs. It is noted that the determination of whether the first processing or the second processing is performed on a collided resource element in the physical resource unit may be based on the specific characteristics of the type of reference signals assigned on the collided resource element.

It is noted that the manner of combing the first processing and the second processing may be different from the described above. For example, it is possible to divide all of collided REs to two classes, with the first class including REs assigned with a data signal and a RS and the second class including REs assigned with a UL RS and a DL RS. Then, the second processing is performed on REs in the first class, that is, data signals assigned on REs are suppressed to protect RSs assigned on REs. Meanwhile, the first processing is performed on REs in the second class, that is, CDM is applied between UL RSs and DL RSs assigned on REs. In short, the second processing is performed for RS-data collision while the first processing is performed for RS-RS collision.

It is noted that those skilled in the art may also use any other manner of combing the first processing and the second processing by taking the trade-off between the cost and efficiency for example and the manner does not limit the present disclosure.

With combination of the first processing (CDM processing) and the second processing (signal suppression), the interference on reference signals between UL and DL channels in full-duplex communication can be reduced, thus improving the demodulation performance and maintaining a high spectrum efficiency.

The above examples in FIGS. 5-12 are all corresponding to cases that TA (Timing Advance) is small, that is, the involved cell is small. However, in some cases (e.g. a large cell), TA may be relatively large. In these cases, the first processing and/or the second processing may be applicable through some adjustments. Thus, according to an embodiment of the present disclosure, in the wireless communication method 30 as shown in FIG. 3, the first processing or the second processing is performed by further taking a TA (Time Advance) value into account.

More specifically, according to an embodiment of the present disclosure, in the wireless communication method 30 as shown in FIG. 3, the first processing is used to be further performed such that CDM is applied between the downlink signal on each of collided resource elements in the physical resource unit and the uplink signal assigned on a resource element at a position delayed from each of collided resource elements by the TA value on time domain. And, the second processing further comprises: suppressing uplink signals assigned on resource elements at positions delayed from the resource elements assigned with downlink reference signals thereon in the collided resource elements by the TA value on time domain.

Figure 13:
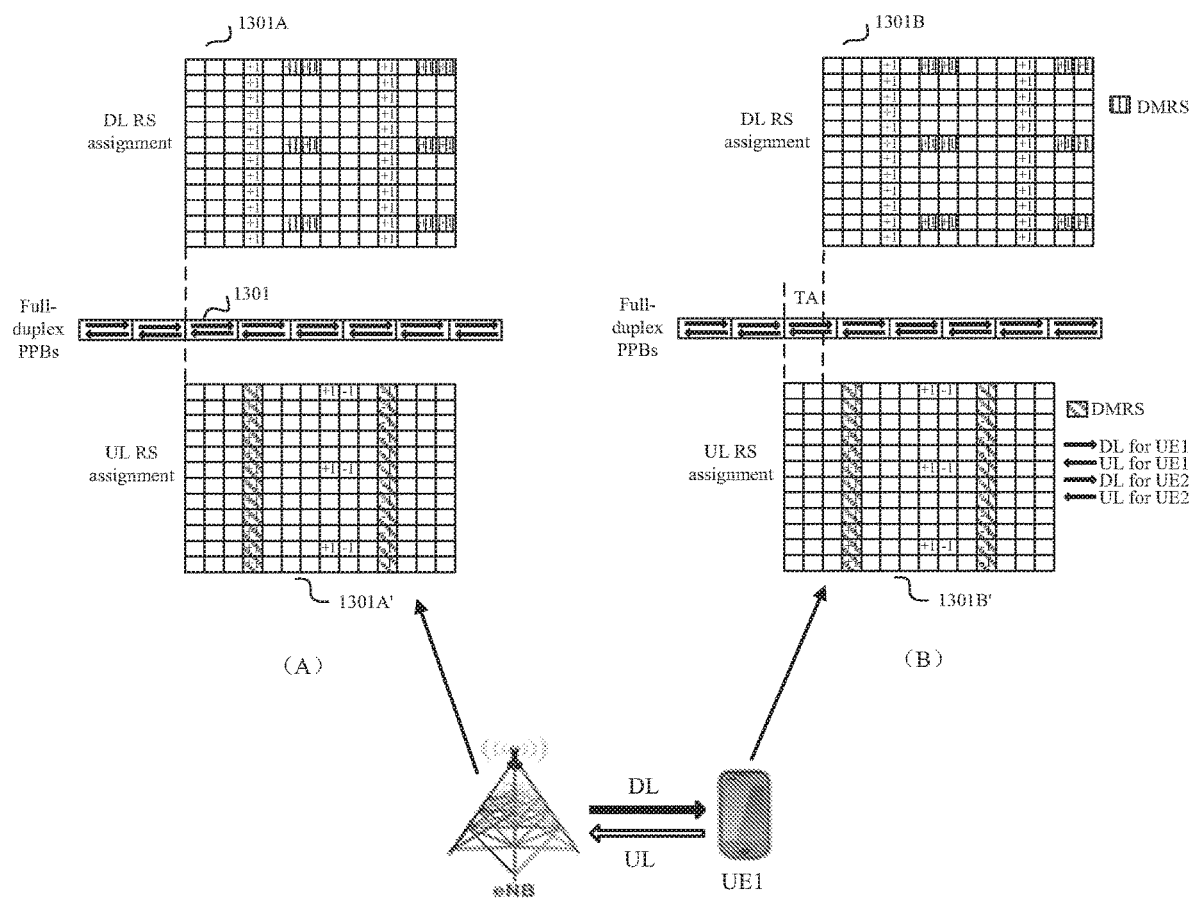
FIG. 13 schematically illustrates an example of performing CDM processing by taking TA into account in full-duplex communication.

FIG. 13 schematically illustrates an example of performing CDM processing by taking TA into account in full-duplex communication. Firstly, the example shown in FIG. 13 corresponds to the case shown in FIG. 4 (B) in which both UL RSs and DL RSs need to be protected. Secondly, The DL and UL RS configuration in FIG. 13 is same as that in FIG. 6 and thus will not be described again here in order for avoiding redundancy. Thirdly, it is assumed that the TA value is large in this example.

Specifically, FIG. 13(A) shows a case at the eNB side in which UL channel and DL channel are aligned well, as shown by the upper block 1301A and the lower block 1301A'. Therefore, the interference on UL channel from DL channel is at the original position, that is, is not affected by the large TA. Thus, when protecting UL RSs, there is no need to take the TA value into account. As shown in FIG. 13(A), the CDM processing performed on collided REs assigned with UL DMRS is same as that in FIG. 6.

In addition, FIG. 13(B) shows a case at UE1 side in which the received DL channel and UL channel are not aligned due to the large TA value, as shown by the upper block 1301B and the lower block 1301B'. Here, it is assumed that the TA value equals to two OFDM symbols on time domain as shown in FIG. 13(B). In this case, when protecting DL RSs, the TA value should be taken into account. As shown in FIG. 13, the CDM processing performed for DL DMRS thereon is different from that in FIG. 6. More specifically, as shown in blocks 1301A' and 1301B', REs assigned with UL signals to be applied with CDM processing thereon should be those delayed from REs assigned with DL DMRS by the two OFDM symbols on time domain.

With the first processing by further taking the TA value into account, it is also possible to reduce the interference on RSs at a case that the TA value is large.

Figure 14:
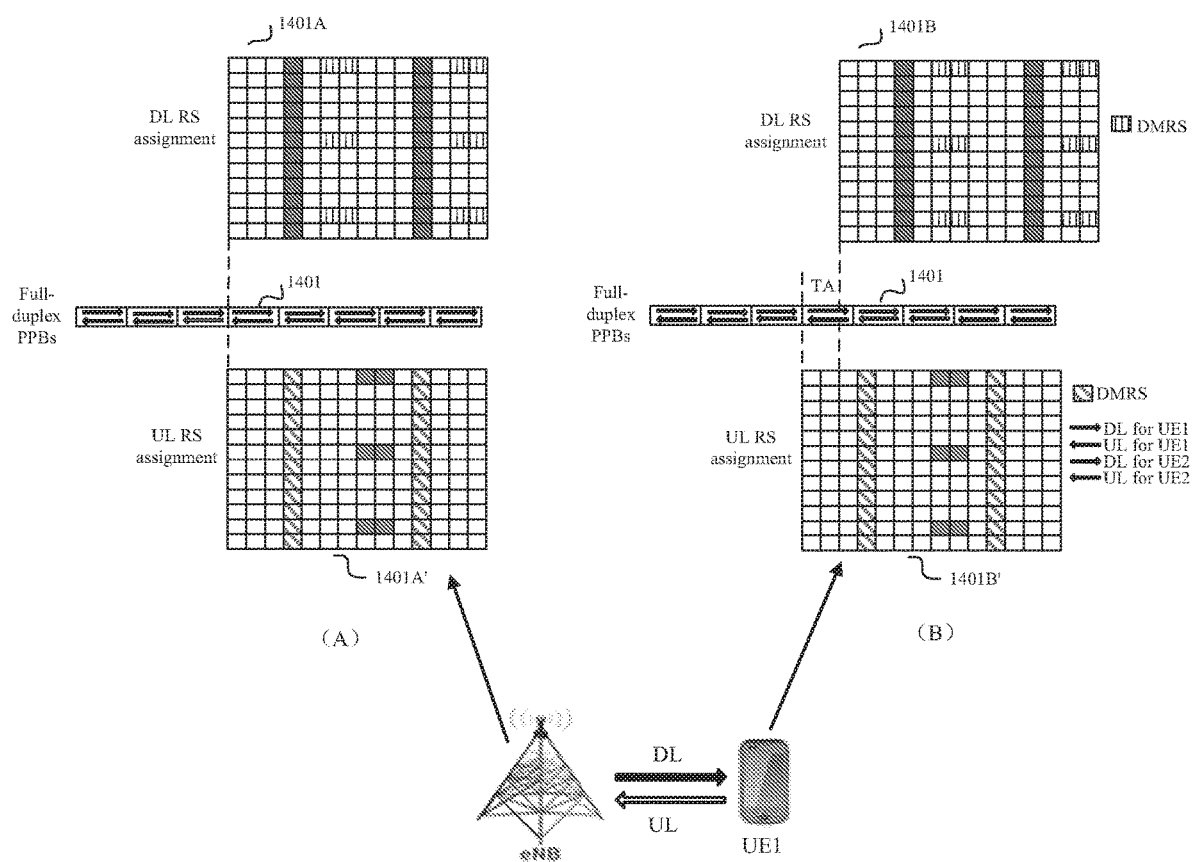
FIG. 14 schematically illustrates an example of performing signal suppression by taking TA into account in full-duplex communication.

FIG. 14 schematically illustrates an example of performing signal suppression by taking TA into account in full-duplex communication. Firstly, the example shown in FIG. 14 also corresponds to the case shown in FIG. 4 (B) in which both UL RSs and DL RSs need to be protected. Secondly, The DL and UL RS configuration in FIG. 14 is same as that in FIG. 11 and thus will not be described again here in order for avoiding redundancy. Thirdly, it is assumed that the TA value is large in this example.

Specifically, FIG. 14(A) shows a case at the eNB side in which UL channel and DL channel are aligned well, as shown by the upper block 1401A and the lower block 1401A'. Therefore, the interference on UL channel from DL channel is at the original position, that is, is not affected by the large TA. Thus, when protecting UL RSs, there is no need to take the TA value into account. As shown in FIG. 14(A), the signal suppression performed on collided REs assigned with UL DMRS is same as that in FIG. 11.

In addition, FIG. 14(B) shows a case at UE1 side in which the received DL channel and UL channel are not aligned due to the large TA value, as shown by the upper block 1401B and the lower block 1401B'. Here, similarly as in FIG. 13, it is assumed that the TA value equals to two OFDM symbols on time domain as shown in FIG. 14(B). In this case, when protecting DL RSs, the TA value should be taken into account. As shown in FIG. 14, the signal suppression performed for DL DMRS thereon is different from that in FIG. 11. More specifically, as shown in blocks 1401A' and 1401B', REs assigned with UL signals to be suppressed thereon should be those delayed from REs assigned with DL DMRS by the two OFDM symbols on time domain.

With the second processing by further taking the TA value into account, it is also possible to reduce the interference on RSs in a case that the TA value is large.

Similarly, when the first processing and the second processing is combined as described above with reference to FIG. 12, by further taking the TA value into account, it is also possible to reduce the interference on RSs in a case that the TA value is large. This will be not described in detail in order for avoiding redundancy.

According to an embodiment of the present disclosure, in the wireless communication method 30 as shown in FIG. 3, whether the uplink signals and downlink signals are for a same user equipment or for different user equipments is signaled from a base station transmitting the downlink signals to a user equipment transmitting the uplink signals in an implicit way or in an explicit way.

Specifically, for example, a user equipment may deduce whether DL signals and UL signals transmitted on a PRB in a full duplex mode for a same user equipment or difference user equipments from received UL and/or DL grants which are signaled by DCI (Downlink Control Information) for example. More specifically, for example in the case shown in FIG. 4(A), UE1 will receive only a DL grant indicating the PRB in a full duplex mode and UE2 will receive only a UL grant indicating the same PRB, thus both UE1 and UE2 can deduce that DL signals and UL signals transmitted on the PRB are for different user equipments, that is, DL signals are for UE1 while UL signals are for UE2. Or, for example in the case shown in FIG. 4(B), when UE1 receives both UL and DL grants indicating a same PRB, UE1 may deduce that DL signals and UL signals transmitted on the PRB are for a same user equipment, i.e. UE1 itself.

Using UL and/or DL grants as described above is an implicit way for a user equipment to know whether DL signals and UL signals transmitted on a PRB in a full duplex mode are for a same user equipment or for difference user equipments. With the implicit way, there is no need to additionally set other signaling and thus the signaling overhead is reduced. However, if any one of grants is lost, there will be misunderstanding between the base station (eNB) and user equipments. In this case, retransmission mechanism may be relied on to handle these error cases.

An alternative way for a user equipment to know whether DL signals and UL signals transmitted on a PRB in a full duplex mode are for a same user equipment or for difference user equipments is indication in an explicit way. For example, it is possible to explicitly indicate whether DL signals and UL signals transmitted on a PRB in a full duplex mode are for a same user equipment or for difference user equipments by some bits in existing DCI or by a new format of DCI. With the explicit way, even if one of grants is lost, there will be no ambiguousness between the base station and the user equipments.

According to an embodiment of the present disclosure, in the wireless communication method 30 as shown in FIG. 3, whether the first processing and/or the second processing is performed, the specific setting of the first processing or the second processing and disabling of the first processing and/or the second processing is signaled from a base station transmitting the downlink signals to a user equipment transmitting the uplink signals in an explicit way.

Specifically, since whether the first processing or the second processing or their combination is performed, the specific setting of the first processing or the second processing (for example, specific manner of grouping collided REs, the selection of orthogonal codes and the like in the first processing, and the specific implementation (puncturing, rate matching, power reduction, etc) of the second processing) and whether to disable the first and/or the second processing is decided at the base station (for example eNB). Thus, it is needed to notify the related information to user equipments from the eNB. For example, it is possible to signal the information to user equipments from the eNB via explicit signaling by RRC (Radio Resource Control), MAC (Media Access Control) or DCI.

It is noted that DCI, RRC and MAC as described above are only examples for illustration, and the present disclosure is not limited thereto. Depending on the teaching from the present disclosure, it is possible to employ any other suitable signaling for notification of the above information, which will falls within the scope of the present disclosure.

According to an embodiment of the present disclosure, in the wireless communication method 30 as shown in FIG. 3, the waveforms used by the uplink signals and the waveforms used by the downlink signals are same with or different from each other.

In NR, waveform is still under discussion and in the end UL channel and DL channel may use different waveforms. Proposed solution is desirable to consider different outcome of NR discussion. Common method should be proposed to implement only on the collided position and be adaptable. In addition, UE side full duplex issue and eNB side full duplex can be different, which need to be considered separately.

The solution proposed above in the present disclosure is adaptable for different waveform techniques. Specifically, in the present disclosure, DL signals and UL signals transmitted on the PRB in a full duplex mode may use same or different waveforms. That is to say, both the first processing and the second processing have not requirement on waveforms used by UL and DL signals in full-duplex operation.

According to an embodiment of the present disclosure, in the wireless communication method 30 as shown in FIG. 3, one or a plurality of neighbor resource elements of the collided resource element to be performed the first processing or the second processing is reserved based on a waveform technique.

Specifically, as described above, waveform is still under discussion in NR. Based on a certain wave technique, in order to help analogue cancellation, one or a plurality of neighbor REs of the collided RE which is to be performed the first processing or the second processing may need to be reserved.

It is also noted that, although the above examples all relate to LTE scenarios, they are only for the purpose of illustration. The present disclosure is not limited to LTE scenarios and a base station is not limited to eNB.

In the above, the wireless communication method 30 is described in detail with reference to FIGS. 3-12. With the wireless communication method 30, by performing the first processing (CDM) or the second processing (signal suppression) or the combination of them, the interference on reference signals between UL and DL channels in full-duplex communication can be reduced, thus improving the demodulation/channel estimation performance and maintaining a high spectrum efficiency.

Figure 15:
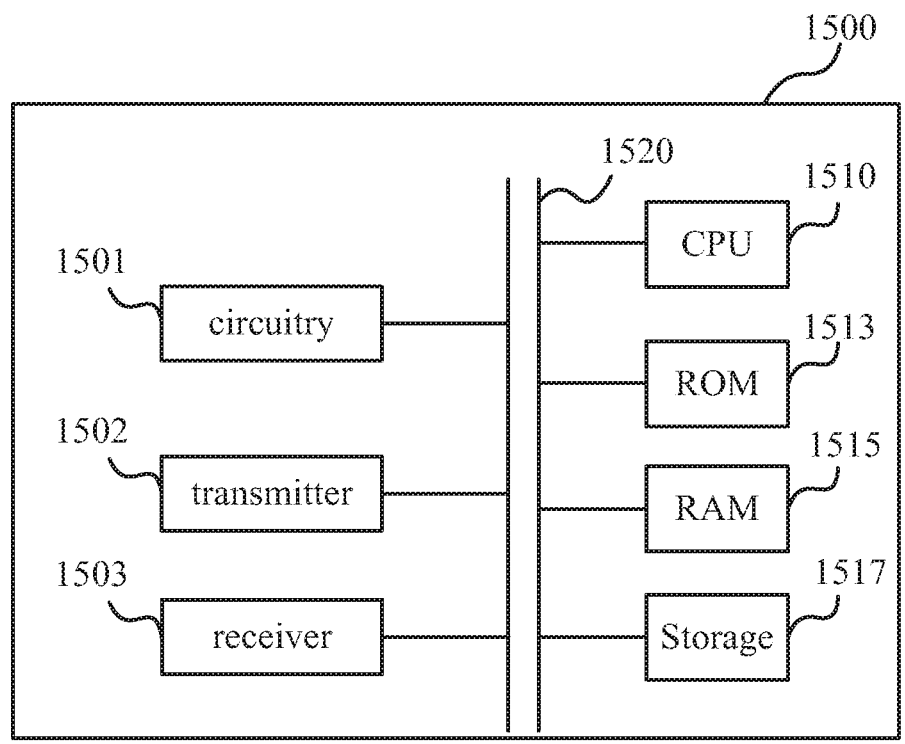
FIG. 15 illustrates a block diagram of a base station according to a further embodiment of the present disclosure.

In a further embodiment of the present disclosure, there is provided a base station 1500 as shown in FIG. 15. FIG. 15 illustrates a block diagram of a base station 1500 according to a further embodiment of the present disclosure.

As shown in FIG. 15, the base station 1500 includes: a circuitry 1501 operative to perform at least one of a first processing and a second processing on downlink signals to be transmitted on a physical resource unit in a full duplex mode corresponding to one Transmission Time Interval (TTI); a transmitter 1502 operative to transmit the processed downlink signals on the physical resource unit to a first user equipment in a TTI; and a receiver 1503 operative to receive uplink signals on the physical resource unit from a second user equipment. The first processing is use to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal. And, the second processing comprises suppressing at least part of the downlink signals assigned on the resource elements assigned with uplink reference signals thereon in the collided resource elements.

The base station 1500 according to the present embodiment may further include a CPU (Central Processing Unit) 1510 for executing related programs to process various data and control operations of respective units in the base station 1500, a ROM (Read Only Memory) 1513 for storing various programs required for performing various process and control by the CPU 1510, a RAM (Random Access Memory) 1515 for storing intermediate data temporarily produced in the procedure of process and control by the CPU 1510, and/or a storage unit 1517 for storing various programs, data and so on. The above circuitry 1501, transmitter 1502, receiver 1503, CPU 1510, ROM 1513, RAM 1515 and/or storage unit 1517 etc. may be interconnected via data and/or command bus 1520 and transfer signals between one another.

Respective units as described above do not limit the scope of the present disclosure. According to one embodiment of the disclosure, the functions of the above circuitry 1501, transmitter 1502 and receiver 1503 may be implemented by hardware, and the above CPU 1510, ROM 1513, RAM 1515 and/or storage unit 1517 may not be necessary. Alternatively, part or all of functions of the above circuitry 1501, transmitter 1502 and/or receiver 1503 may also be implemented by functional software in combination with the above CPU 1510, ROM 1513, RAM 1515 and/or storage unit 1517 etc.

Specifically, the base station 1500 may be eNB 410 as shown in FIG. 4. That is to say, for the case as shown in FIG. 4(A), the base station 1500 may perform the wireless communication method 30 as described above in conjunction with UE2. Also, for the case as shown in FIG. 4(B), the base station 1500 may perform the wireless communication method 30 as described above in conjunction with UE1. As described above, the base station 1500 may also be other types of base stations than the eNB.

According to an embodiment of the present disclosure, in the base station 1500 as shown in FIG. 15, the first processing or the second processing is different depending on whether the first user equipment is same with or different from the second user equipment.

According to an embodiment of the present disclosure, in the base station 1500 as shown in FIG. 15, the first user equipment is different from the second user equipment, and the at least part of collided resource elements is only the resource elements assigned with uplink reference signals thereon in the collided resource elements. And, the first processing comprises: grouping the resource elements assigned with uplink reference signals thereon in the collided resource elements into at least one group; and for each group, applying one of a pair of orthogonal codes to the downlink signals assigned on the resource elements of the group, wherein the other of the pair of orthogonal codes is applied to the uplink reference signals assigned on the resource elements of the group at the second user equipment.

According to an embodiment of the present disclosure, in the base station 1500 as shown in FIG. 15, the first user equipment and the second equipment are a same user equipment, and the at least part of collided resource elements is all of the collided resource elements. And the first processing comprises: grouping the resource elements assigned with uplink reference signals thereon in the collided resource elements into at least one group, and for each group, applying one of a pair of orthogonal codes to the downlink signals assigned on the resource elements of the group, wherein the other of the pair of orthogonal codes is applied to the uplink reference signals assigned on the resource elements of the group at the second user equipment; and grouping the resource elements assigned with only downlink reference signals of uplink and downlink reference signals thereon in the collided resource elements into at least one group, and for each group, applying the one of the pair of orthogonal codes to the downlink reference signals assigned on the resource elements of the group, wherein the other of the pair of orthogonal codes is applied to the uplink signals assigned on the resource elements of the group at the second user equipment.

According to an embodiment of the present disclosure, in the base station 1500 as shown in FIG. 15, grouping the resource elements is based on at least one of the positions of the resource elements in the physical resource unit and the types of the reference signals assigned on the resource elements.

According to an embodiment of the present disclosure, in the base station 1500 as shown in FIG. 15, the first processing comprises: for each frequency resource unit in the physical resource unit, grouping the resource elements assigned with uplink reference signals thereon into at least one group, wherein each group comprises N nearest resource elements on time domain, wherein N is an integer which is greater than 1; and for each group, applying the one of the pair of orthogonal codes to the downlink signals assigned on the resource elements of the group, wherein the other of the pair of orthogonal codes is applied to the uplink reference signals assigned on the resource elements of the group at the second user equipment, wherein the length of each orthogonal code of the pair of orthogonal codes is equal to N.

According to an embodiment of the present disclosure, in the base station 1500 as shown in FIG. 15, the first user equipment is different from the second user equipment, and wherein said suppressing at least part of the downlink signals assigned on the resource elements assigned with uplink reference signals thereon in the collided resource elements comprises: suppressing all of the downlink signals assigned on the resource elements assigned with uplink reference signals thereon in the collided resource elements.

According to an embodiment of the present disclosure, in the base station 1500 as shown in FIG. 15, the first user equipment and the second equipment are a same user equipment. And, said suppressing at least part of the downlink signals assigned on the resource elements assigned with uplink reference signals thereon in the collided resource elements comprises: suppressing the downlink signals assigned on the resource elements assigned with only uplink reference signals of uplink and downlink reference signals thereon in the collided resource elements; and for each of the resource elements assigned with both downlink and uplink reference signals thereon in the collided resource elements, if the priority of the downlink reference signal assigned on the resource element is lower than that of the uplink reference signal assigned on the resource element, suppressing the downlink reference signal, otherwise the uplink reference signal is suppressed at the second user equipment. And when the second processing is performed, the uplink signals assigned on the resource elements assigned with only downlink reference signals of uplink and downlink reference signals thereon in the collided resource elements is suppressed at the second user equipment.

According to an embodiment of the present disclosure, in the base station 1500 as shown in FIG. 15, whether the first processing or the second processing is performed on a collided resource element in the physical resource unit is determined based on the type of reference signals assigned on the collided resource element.

With the base station 1500 as shown in FIG. 15, by performing the first processing (CDM) or the second processing (signal suppression) or the combination of them, the interference on reference signals between UL and DL channels in full-duplex communication can be reduced, thus improving the demodulation/channel estimation performance and maintaining a high spectrum efficiency.

Figure 16:
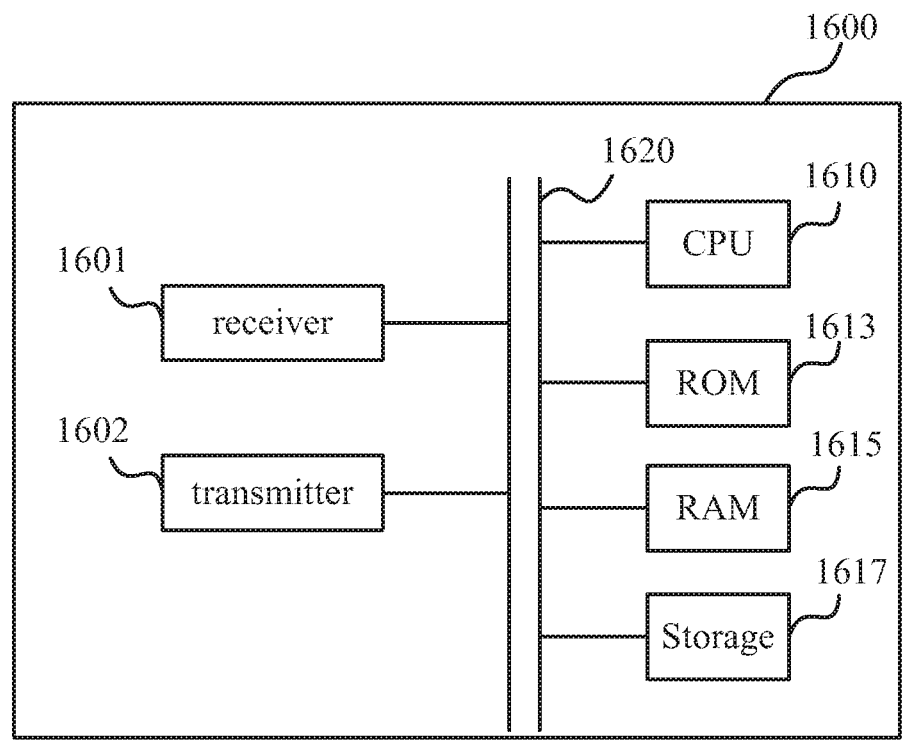
FIG. 16 illustrates a block diagram of a user equipment according to another embodiment of the present disclosure.

In a further embodiment of the present disclosure, there is provided a user equipment 1600 as shown in FIG. 16. FIG. 16 schematically illustrates a block diagram of a user equipment 1600 according to another embodiment of the present disclosure.

As shown in FIG. 16, the user equipment 1600 includes: a receiver 1601 operative to receive first downlink signals from a base station and a transmitter 1602 operative to transmit second uplink signals to the base station. When the first downlink signals are received and/or the second uplink signals are transmitted on a physical resource unit in a full duplex mode corresponding to one Transmission Time Interval (TTI), at least one of Code Division Multiplexing (CDM) and signal suppression is applied to at least part of collided resource elements in the physical resource unit, each of the collided resource elements being assigned with both a downlink signal and a uplink signal at least one of which is a reference signal.

The user equipment 1600 according to the present embodiment may further include a CPU (Central Processing Unit) 1610 for executing related programs to process various data and control operations of respective units in the user equipment 1600, a ROM (Read Only Memory) 1613 for storing various programs required for performing various process and control by the CPU 1610, a RAM (Random Access Memory) 1615 for storing intermediate data temporarily produced in the procedure of process and control by the CPU 1610, and/or a storage unit 1617 for storing various programs, data and so on. The above receiver 1601, transmitter 1602, CPU 1610, ROM 1613, RAM 1615 and/or storage unit 1617 etc. may be interconnected via data and/or command bus 1620 and transfer signals between one another.

Respective units as described above do not limit the scope of the present disclosure. According to one embodiment of the disclosure, the functions of the above receiver 1601 and transmitter 1602 may be implemented by hardware, and the above CPU 1610, ROM 1613, RAM 1615 and/or storage unit 1617 may not be necessary. Alternatively, part or all of functions of the above receiver 1601 or transmitter 1602 may also be implemented by functional software in combination with the above CPU 1610, ROM 1613, RAM 1615 and/or storage unit 1617 etc.

Specifically, the user equipment 1600 may be UE1 shown in FIG. 4(B) or UE2 shown in FIG. 4(A) and may perform the wireless communication method 30 as described above in conjunction with eNB 410.

According to an embodiment of the present disclosure, in the user equipment 1600 as shown in FIG. 16, the receiver receives the first downlink signals on the physical resource unit from the base station, and first uplink signals are transmitted on the physical resource unit from a second user equipment different from the user equipment, and before being transmitted from the base station, the first downlink signals are performed at least one of a first processing and a second processing at the base station. And, the first processing is used to be performed such that CDM is applied between the first downlink signal and the first uplink signal assigned on each of at least part of collided resource elements in the physical resource unit, each of the collided resource elements being assigned with both a first downlink signal and a first uplink signal at least one of which is a reference signal, and the second processing comprises suppressing the first downlink signals assigned on the resource elements assigned with uplink reference signals thereon in the collided resource elements.

Specifically, in this embodiment, the user equipment 1600 functions as UE1 in the case shown in FIG. 4(A), the second user equipment corresponds to UE2 and the base station corresponds to eNB 410. In this case, UE1 receives the first downlink signals from eNB 410 on a PRB in a full duplex mode. In the PRB, the first downlink signals from eNB 410 and the first uplink signals from UE2 operate in full duplex. Also, as described above, since the first downlink signals and the first uplink signals are for different UEs, only UL RSs from UE2 need to be protected. Thus, CDM or signal suppression is applied to collided REs assigned with UL RSs in the PRB so as to reduce the interference on UL RSs. At UE1 side, it needs not to perform any processing to reduce the interference on RSs, but needs to know the specific processing performed on the first downlink signals from eNB 410 in order to demodulate the first downlink signals. As described above, eNB 410 may signal the related information of the specific processing to UE1 by implicit or explicit signaling.

According to an embodiment of the present disclosure, in the user equipment 1600 as shown in FIG. 16, the transmitter transmits the second uplink signals on the physical resource unit to the base station, and second downlink signals are transmitted on the physical resource unit to a second user equipment different from the user equipment from the base station. And, although not shown in FIG. 16, the user equipment may further comprises: a circuitry operative to perform a first processing on the second uplink signals before transmission when the first processing is performed on the second downlink signals at the base station. And, before being transmitted from the base station, the second downlink signals are performed at least one of the first processing and a second processing at the base station. The first processing is used to be performed such that CDM is applied between the second downlink signal and the second uplink signal assigned on each of collided resource elements in the physical resource unit, each of the collided resource elements being assigned with both a second downlink signal and a second uplink signal at least one of which is a reference signal, and the second processing comprises suppressing the second downlink signals assigned on the resource elements assigned with uplink reference signals thereon in the collided resource elements.

Specifically, in this embodiment, the user equipment 1600 functions as UE2 in the case shown in FIG. 4(A), the second user equipment corresponds to UE1 and the base station corresponds to eNB 410. In this case, UE2 transmits the second uplink signals to eNB 410 on a PRB in full duplex mode and eNB 410 transmits the second downlink signals on the PRB to UE1. Thus, in the PRB, the second downlink signals from eNB 410 and the second uplink signals from UE2 operate in full duplex. Also, as described above, since the second downlink signals and the second uplink signals are for different UEs, only UL RSs from UE2 need to be protected. Thus, CDM or signal suppression is applied to collided REs assigned with UL RSs in the PRB so as to reduce the interference on UL RSs. If the first processing (CDM) is performed at eNB 410, the first processing (CDM) should also be performed at UE2 so that CDM may be applied between the second downlink signals and the second uplink signals assigned on collided REs assigned with UL RSs thereon in the PRB. Otherwise, if the second processing (signal suppression) is performed at eNB 410, that is, DL signals assigned on collided REs assigned with UL RSs in the PRB are suppressed to protect UL RSs, there is no need for UE2 to do any processing on the second uplink signals before transmission then. As described above, eNB 410 may signal the related information as to whether the first processing or the second processing is performed at eNB 410 and so on to UE2 by implicit or explicit signaling.

According to an embodiment of the present disclosure, in the user equipment 1600 as shown in FIG. 16, the receiver receives the first downlink signals on the physical resource unit from the base station and the transmitter transmits the second uplink signals on the physical resource unit to the base station. And, although not shown in FIG. 16, the user equipment further comprises: a circuitry operative to perform at least one of a first processing and a second processing on the second uplink signals before transmission. The first processing is used to be performed such that CDM is applied between the first downlink signal and the second uplink signal assigned on each of collided resource elements in the physical resource unit, each of the collided resource elements being assigned with both a first downlink signal and a second uplink signal at least one of which is a reference signal, and the second processing comprises suppressing at least part of the second uplink signals assigned on the resource elements assigned with first downlink reference signals thereon in the collided resource elements.

Specifically, in this embodiment, the user equipment 1600 functions as UE1 in the case shown in FIG. 4(B) and the base station corresponds to eNB 410. In this case, UE1 transmits the second uplink signals to eNB 410 on a PRB in a full duplex mode and eNB 410 transmits the first downlink signals on the PRB to UE1. Thus, in the PRB, the first downlink signals from eNB 410 and the second uplink signals from UE1 operate in full duplex. Also, as described above, since the first downlink signals and the second uplink signals are for a same UE, both UL RSs from UE1 and DL RSs from eNB 410 need to be protected. Thus, CDM or signal suppression is applied to collided REs assigned with at least one of UL RSs and DL RSs in the PRB so as to reduce the interference on UL RSs and DL RSs.

According to an embodiment of the present disclosure, in the user equipment 1600 as shown in FIG. 16, the first processing comprises: grouping the resource elements assigned with the downlink reference signals thereon in the collided resource elements into at least one group, and for each group, applying one of a pair of orthogonal codes to the second uplink signals assigned on the resource elements of the group, and the other of the pair of orthogonal codes is applied to the downlink reference signals assigned on the resource elements of the group at the base station; and grouping the resource elements assigned with only uplink reference signals of uplink and downlink reference signals thereon in the collided resource elements into at least one group, and for each group, applying the one of the pair of orthogonal codes to the uplink reference signals assigned on the resource elements of the group, and the other of the pair of orthogonal codes is applied to the first downlink signals assigned on the resource elements of the group at the base station.

According to an embodiment of the present disclosure, in the user equipment 1600 as shown in FIG. 16, said suppressing at least part of the second uplink signals assigned on the resource elements assigned with first downlink reference signals thereon in the collided resource elements comprises: suppressing the second uplink signals assigned on the resource elements assigned with only downlink reference signals of uplink and downlink reference signals thereon in the collided resource elements; and for each of the resource elements assigned with both downlink and uplink reference signals thereon in the collided resource elements, if the priority of the uplink reference signal assigned on the resource element is lower than that of the downlink reference signal assigned on the resource element, suppressing the uplink reference signal, otherwise the downlink reference signal is suppressed at the base station.

According to an embodiment of the present disclosure, in the user equipment 1600 as shown in FIG. 16, whether the first processing or the second processing is performed on a collided resource element in the physical resource unit is determined based on the type of reference signals assigned on the collided resource element.

According to an embodiment of the present disclosure, in the user equipment 1600 as shown in FIG. 16, the first processing or the second processing is performed by further taking a TA (Time Advance) value into account.

According to an embodiment of the present disclosure, in the user equipment 1600 as shown in FIG. 16, the first processing is used to be further performed such that CDM is applied between the first downlink signal on each of collided resource elements in the physical resource unit and the second uplink signal assigned on a resource element at a position delayed from each of collided resource elements by the TA value on time domain, and the second processing further comprises: suppressing second uplink signals assigned on resource elements at positions delayed from the resource elements assigned with downlink reference signals thereon in the collided resource elements by the TA on time domain.

With the user equipment 1600 as shown in FIG. 16, by performing the first processing (CDM) or the second processing (signal suppression) or the combination of them, the interference on reference signals between UL and DL channels in full-duplex communication can be reduced, thus improving the demodulation/channel estimation performance and maintaining a high spectrum efficiency.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A base station comprising:
- circuitry operative to perform at least one of a first processing and a second processing on downlink signals to be transmitted on a physical resource unit in a full duplex mode corresponding to one Transmission Time Interval (TTI);
- a transmitter operative to transmit the processed downlink signals on the physical resource unit to a first user equipment in a TTI; and
- a receiver operative to receive uplink signals on the physical resource unit from a second user equipment, wherein
- the first processing is use to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal, and
- the second processing comprises suppressing at least part of the downlink signals assigned on the resource elements assigned with uplink reference signals thereon in the collided resource elements.

(2). The base station according to (1), wherein the first processing or the second processing is different depending on whether the first user equipment is same with or different from the second user equipment.

(3). The base station according to (2), wherein the first user equipment is different from the second user equipment, and the at least part of collided resource elements is only the resource elements assigned with uplink reference signals thereon in the collided resource elements, and wherein
the first processing comprises:
- grouping the resource elements assigned with uplink reference signals thereon in the collided resource elements into at least one group; and
- for each group, applying one of a pair of orthogonal codes to the downlink signals assigned on the resource elements of the group, wherein the other of the pair of orthogonal codes is applied to the uplink reference signals assigned on the resource elements of the group at the second user equipment.

(4). The base station according to (2), wherein the first user equipment and the second equipment are a same user equipment, and the at least part of collided resource elements is all of the collided resource elements, and wherein
the first processing comprises:
- grouping the resource elements assigned with uplink reference signals thereon in the collided resource elements into at least one group, and for each group, applying one of a pair of orthogonal codes to the downlink signals assigned on the resource elements of the group, wherein the other of the pair of orthogonal codes is applied to the uplink reference signals assigned on the resource elements of the group at the second user equipment; and
- grouping the resource elements assigned with only downlink reference signals of uplink and downlink reference signals thereon in the collided resource elements into at least one group, and for each group, applying the one of the pair of orthogonal codes to the downlink reference signals assigned on the resource elements of the group, wherein the other of the pair of orthogonal codes is applied to the uplink signals assigned on the resource elements of the group at the second user equipment.

(5). The base station according to (3) or (4), wherein grouping the resource elements is based on at least one of the positions of the resource elements in the physical resource unit and the types of the reference signals assigned on the resource elements.

(6). The base station according to (5), wherein the first processing comprises:
for each frequency resource unit in the physical resource unit, grouping the resource elements assigned with uplink reference signals thereon into at least one group, wherein each group comprises N nearest resource elements on time domain, wherein N is an integer which is greater than 1; and
for each group, applying the one of the pair of orthogonal codes to the downlink signals assigned on the resource elements of the group, wherein the other of the pair of orthogonal codes is applied to the uplink reference signals assigned on the resource elements of the group at the second user equipment, wherein the length of each orthogonal code of the pair of orthogonal codes is equal to N.

(7). The base station according to (5), wherein the first processing comprises:
for each frequency resource unit in the physical resource unit, grouping the resource elements assigned with uplink reference signals thereon into a plurality of groups, wherein one group comprises M nearest resource elements on time domain and each of remaining groups comprises N nearest resource elements on time domain, wherein N is an integer which is greater than 1 and M is an integer which is greater than 0 and less than N;
for each of the remaining groups, applying the one of the pair of orthogonal codes to the downlink signals assigned on the resource elements of the group, wherein the other of the pair of orthogonal codes is applied to the uplink reference signals assigned on the resource elements of the group at the second user equipment, wherein the length of each orthogonal code of the pair of orthogonal codes is equal to N; and
for said one group, applying the one of the pair of orthogonal codes to the downlink signals assigned on the M resource elements of said one group and N-M resource elements adjacent to the M resource elements on the time domain, wherein the other of the pair of orthogonal codes is applied to the uplink reference signals assigned on the M resource elements of said one group and uplink signals assigned on said N-M resource elements adjacent to the M resource elements on the time domain at the second user equipment.

(8). The base station according to (6) or (7), wherein the first processing further comprises:
for each frequency resource unit in the physical resource unit, grouping the resource elements assigned with only downlink reference signals of uplink and downlink reference signals thereon into at least one group, wherein each group comprises N nearest resource elements on time domain; and
for each group, applying the one of the pair of orthogonal codes to the downlink reference signals assigned on the resource elements of the group, wherein the other of the pair of orthogonal codes is applied to the uplink signals assigned on the resource elements of the group at the second user equipment.

(9). The base station according to (6) or (7), wherein the first processing further comprises:
for each frequency resource unit in the physical resource unit, grouping the resource elements assigned with only downlink reference signals of uplink and downlink reference signals into a plurality of groups, wherein one group comprises P nearest resource elements on time domain and each of remaining groups comprises N nearest resource elements on time domain, wherein P is an integer which is greater than 0 and less than N;
for each of the remaining groups, applying the one of the pair of orthogonal codes to the downlink reference signals assigned on the resource elements of the group, wherein the other of the pair of orthogonal codes is applied to the uplink signals assigned on the resource elements of the group at the second user equipment; and
for said one group, applying the one of the pair of orthogonal codes to the downlink reference signals assigned on the P resource elements of said one group and downlink signals assigned on N-P resource elements adjacent to the P resource elements on the time domain, wherein the other of the pair of orthogonal codes is applied to the uplink signals assigned on the P resource elements of said one group and said N-P resource elements adjacent to the P resource elements on the time domain at the second user equipment.

(10). The base station according to (5), wherein the uplink signals received on the physical resource unit comprises a plurality of types of uplink reference signals, and wherein
for each type of the uplink reference signals, the first processing comprises:
for each frequency resource unit in the physical resource unit, grouping the resource elements assigned with the type of uplink reference signals thereon into at least one group, wherein each group comprises N nearest resource elements on time domain, wherein N is an integer which is greater than 1; and
for each group, applying the one of the pair of orthogonal codes to downlink signals assigned on the resource element of the group, wherein the other of the pair of orthogonal codes is applied to the type of uplink reference signals assigned on the resource elements of the group at the second user equipment, wherein the length of each orthogonal code of the pair orthogonal codes is equal to N.

(11). The base station according to (5), wherein the uplink signals received on the physical resource unit comprises a plurality of types of uplink reference signals, and wherein
for each type of the uplink reference signals, the first processing comprises:
for each frequency resource unit in the physical resource unit, grouping the resource elements assigned with the type of uplink reference signals into a plurality of groups, wherein one group comprises M nearest resource elements on time domain and each of remaining groups comprises N nearest resource elements on time domain, wherein N is an integer which is greater than 1 and M is an integer which is greater than 0 and less than N;
for each of the remaining groups, applying the one of the pair of orthogonal codes to downlink signals assigned on the resource element of the group, wherein the other of the pair of orthogonal codes is applied to the type of uplink reference signals assigned on the resource elements of the group at the second user equipment; and
for said one group, applying the one of the pair of orthogonal codes to downlink signals assigned on the M resource elements of said one group and N-M resource elements adjacent to the M resource elements on the time domain, wherein the other of the pair of orthogonal codes is applied to the type of uplink reference signals assigned on the M resource elements of said one group and uplink signals assigned on said N-M resource elements adjacent to the M resource elements on the time domain at the second user equipment.

(12). The base station according to (10) or (11), wherein the downlink signals transmitted on the physical resource unit comprises a plurality of types of downlink reference signals, and wherein
for each type of the downlink reference signals, the first processing further comprises:
for each frequency resource unit in the physical resource unit, grouping the resource elements assigned with the type of downlink reference signals thereon into at least one group, wherein each group comprises N nearest resource elements on time domain; and
for each group, applying the one of the pair of orthogonal codes to the type of downlink reference signals assigned on the resource element of the group, wherein the other of the pair of orthogonal codes is applied to the uplink signals assigned on the resource elements of the group at the second user equipment.

(13). The base station according to (10) or (11), wherein the downlink signals transmitted on the physical resource unit comprises a plurality of types of downlink reference signals, and wherein
for each type of the downlink reference signals, the first processing further comprises:
for each frequency resource unit in the physical resource unit, grouping the resource elements assigned with the type of downlink reference signals thereon into a plurality of groups, wherein one group comprises P nearest resource elements on time domain and each of remaining groups comprises N nearest resource elements on time domain, wherein P is an integer which is greater than 0 and less than N;
for each of the remaining groups, applying the one of the pair of orthogonal codes to the type of downlink reference signals assigned on the resource elements of the group, wherein the other of the pair of orthogonal codes is applied to the uplink signals assigned on the resource element of the group at the second user equipment; and for said one group, applying the one of the pair of orthogonal codes to the type of downlink reference signals assigned on the P resource elements of said one group and downlink signals assigned on N-P resource elements adjacent to the P resource elements on the time domain, wherein the other of the pair of orthogonal codes is applied to the uplink signals assigned on the P resource elements of said one group and said N-P resource elements adjacent to the P resource elements on the time domain at the second user equipment.

(14). The base station according to (1), wherein the first processing is performed on one of time domain, frequency domain and code domain.

(15). The base station according to (14), wherein the first processing is performed on time domain, and the first processing is varied per TTI.

(16). The base station according to (14), wherein the first processing is performed on frequency domain, and the first processing is varied per frequency unit in a same TTI.

(17). The base station according to (2), wherein the first user equipment is different from the second user equipment, and wherein said suppressing at least part of the downlink signals assigned on the resource elements assigned with uplink reference signals thereon in the collided resource elements comprises:

suppressing all of the downlink signals assigned on the resource elements assigned with uplink reference signals thereon in the collided resource elements.

(18). The base station according to (2), wherein the first user equipment and the second equipment are a same user equipment, and wherein said suppressing at least part of the downlink signals assigned on the resource elements assigned with uplink reference signals thereon in the collided resource elements comprises:

suppressing the downlink signals assigned on the resource elements assigned with only uplink reference signals of uplink and downlink reference signals thereon in the collided resource elements; and for each of the resource elements assigned with both downlink and uplink reference signals thereon in the collided resource elements,
if the priority of the downlink reference signal assigned on the resource element is lower than that of the uplink reference signal assigned on the resource element, suppressing the downlink reference signal, otherwise the uplink reference signal is suppressed at the second user equipment, and wherein when the second processing is performed, the uplink signals assigned on the resource elements assigned with only downlink reference signals of uplink and downlink reference signals thereon in the collided resource elements is suppressed at the second user equipment.

(19). The base station according to (1), wherein said suppressing is implemented by one of: not allocating said signal on the resource element by rate matching; puncturing said signal on the resource element; reducing the power of said signal on the resource element to zero; reducing the power of said signal on the resource element to a less value.

(20). The base station according to (19), wherein the suppressed signal is further reallocated to another resource element different from said resource element.

(21). The base station according to (1), wherein the second processing is varied per TTI.

(22). The base station according to (1), wherein whether the first processing or the second processing is performed on a collided resource element in the physical resource unit is determined based on the type of reference signals assigned on the collided resource element.

(23). The base station according to (1), wherein whether the first user equipments and the second user equipment are a same user equipment or different user equipments is signaled from the base station to the first user equipment and/or the second user equipment in an implicit way or in an explicit way.

(24). The base station according to (1), wherein whether the first processing and/or the second processing is performed, the specific setting of the first processing or the second processing and disabling of the first processing and/or the second processing is signaled from the base station to the first user equipment and/or the second user equipment in an explicit way.

(25). The base station according to (1), wherein the waveforms used by the uplink signals and the waveforms used by the downlink signals are same with or different from each other.

(26). The base station according to (25), wherein one or a plurality of neighbor resource elements of the collided resource element to be performed the first processing or the second processing is reserved based on a waveform technique.

(27). A user equipment comprising:
a receiver operative to receive first downlink signals from a base station; and
a transmitter operative to transmit second uplink signals to the base station, wherein
when the first downlink signals are received and/or the second uplink signals are transmitted on a physical resource unit in a full duplex mode corresponding to one Transmission Time Interval (TTI), at least one of Code Division Multiplexing (CDM) and signal suppression is applied to at least part of collided resource elements in the physical resource unit, each of the collided resource elements being assigned with both a downlink signal and a uplink signal at least one of which is a reference signal.

(28). The user equipment according to (27), wherein the receiver receives the first downlink signals on the physical resource unit from the base station, wherein first uplink signals are transmitted on the physical resource unit from a second user equipment different from the user equipment, and wherein before being transmitted from the base station, the first downlink signals are performed at least one of a first processing and a second processing at the base station, wherein the first processing is used to be performed such that CDM is applied between the first downlink signal and the first uplink signal assigned on each of at least part of collided resource elements in the physical resource unit, each of the collided resource elements being assigned with both a first downlink signal and a first uplink signal at least one of which is a reference signal, and the second processing comprises suppressing the first downlink signals assigned on the resource elements assigned with uplink reference signals thereon in the collided resource elements.

(29). user equipment according to (27), wherein the transmitter transmits the second uplink signals on the physical resource unit to the base station, wherein second downlink signals are transmitted on the physical resource unit to a second user equipment different from the user equipment from the base station, and wherein the user equipment further comprising:
a circuitry operative to perform a first processing on the second uplink signals before transmission when the first processing is performed on the second downlink signals at the base station, and wherein
before being transmitted from the base station, the second downlink signals are performed at least one of the first processing and a second processing at the base station, wherein
the first processing is used to be performed such that CDM is applied between the second downlink signal and the second uplink signal assigned on each of collided resource elements in the physical resource unit, each of the collided resource elements being assigned with both a second downlink signal and a second uplink signal at least one of which is a reference signal, and
the second processing comprises suppressing the second downlink signals assigned on the resource elements assigned with uplink reference signals thereon in the collided resource elements.

(30). user equipment according to (27), wherein the receiver receives the first downlink signals on the physical resource unit from the base station and the transmitter transmits the second uplink signals on the physical resource unit to the base station, and wherein the user equipment further comprises:
a circuitry operative to perform at least one of a first processing and a second processing on the second uplink signals before transmission, wherein
the first processing is used to be performed such that CDM is applied between the first downlink signal and the second uplink signal assigned on each of collided resource elements in the physical resource unit, each of the collided resource elements being assigned with both a first downlink signal and a second uplink signal at least one of which is a reference signal, and
the second processing comprises suppressing at least part of the second uplink signals assigned on the resource elements assigned with first downlink reference signals thereon in the collided resource elements.

(31). The user equipment according to (30), wherein the first processing comprises:
grouping the resource elements assigned with the downlink reference signals thereon in the collided resource elements into at least one group, and for each group, applying one of a pair of orthogonal codes to the second uplink signals assigned on the resource elements of the group, wherein the other of the pair of orthogonal codes is applied to the downlink reference signals assigned on the resource elements of the group at the base station; and
grouping the resource elements assigned with only uplink reference signals of uplink and downlink reference signals thereon in the collided resource elements into at least one group, and for each group, applying the one of the pair of orthogonal codes to the uplink reference signals assigned on the resource elements of the group, wherein the other of the pair of orthogonal codes is applied to the first downlink signals assigned on the resource elements of the group at the base station.

(32). The user equipment according to (31), wherein grouping the resource elements is based on at least one of the positions of the resource elements in the physical resource unit and the types of the reference signals assigned on the resource elements.

(33). The user equipment according to (32), wherein the first processing comprises:
for each frequency resource unit in the physical resource unit,
grouping the resource elements assigned with uplink reference signals thereon into at least one group, wherein each group comprises N nearest resource elements on time domain, wherein N is an integer which is greater than 1;
for each group, applying the one of the pair of orthogonal codes to the uplink reference signals assigned on the resource elements of the group, wherein the other of the pair of orthogonal codes is applied to the first downlink signals assigned on the resource elements of the group at the base station, wherein the length of each orthogonal code of the pair of orthogonal codes is equal to N; and
for each frequency resource unit in the physical resource unit,
grouping the resource elements assigned with only downlink reference signals of uplink and downlink reference signals thereon into at least one group, wherein each group comprises N nearest resource elements on time domain; and
for each group, applying the one of the pair of orthogonal codes to the second uplink reference signals assigned on the resource elements of the group, wherein the other of the pair of orthogonal codes is applied to the downlink reference signals assigned on the resource elements of the group at the base station.

(34). The user equipment according to (32), wherein the first processing comprises:
for each frequency resource unit in the physical resource unit,
grouping the resource elements assigned with uplink reference signals thereon into a plurality of groups, wherein one group comprises M nearest resource elements on time domain and each of remaining groups comprises N nearest resource elements on time domain, wherein N is an integer which is greater than 1 and M is an integer which is greater than 0 and less than N;
for each of the remaining groups, applying the one of the pair of orthogonal codes to the uplink reference signals assigned on the resource elements of the group, wherein the other of the pair of orthogonal codes is applied to the first downlink signals assigned on the resource elements of the group at the base station, wherein the length of each orthogonal code of the pair of orthogonal codes is equal to N;
for said one group, applying the one of the pair of orthogonal codes to the uplink reference signals assigned on the M resource elements of said one group and the second uplink signals assigned on N-M resource elements adjacent to the M resource elements on the time domain, wherein the other of the pair of orthogonal codes is applied to the first downlink signals assigned on the M resource elements of said one group and said N-M resource elements adjacent to the M resource elements on the time domain at the base station; and for each frequency resource unit in the physical resource unit,
- grouping the resource elements assigned with only downlink reference signals of uplink and downlink reference signals into a plurality of groups, wherein one group comprises P nearest resource elements on time domain and each of remaining groups comprises N nearest resource elements on time domain, wherein P is an integer which is greater than 0 and less than N;
- for each of the remaining groups, applying the one of the pair of orthogonal codes to the second uplink signals assigned on the resource elements of the group, wherein the other of the pair of orthogonal codes is applied to the downlink reference signals assigned on the resource elements of the group at the base station; and
- for said one group, applying the one of the pair of orthogonal codes to the second uplink signals assigned on the P resource elements of said one group and N-P resource elements adjacent to the P resource elements on the time domain, wherein the other of the pair of orthogonal codes is applied to the downlink reference signals assigned on the P resource elements of said one group and the first downlink signals assigned on said N-P resource elements adjacent to the P resource elements on the time domain at the base station.

(35). The user equipment according to (32), wherein the first processing comprises:

for each frequency resource unit in the physical resource unit,
- grouping the resource elements assigned with uplink reference signals thereon into at least one group, wherein each group comprises N nearest resource elements on time domain, wherein N is an integer which is greater than 1;
- for each group, applying the one of the pair of orthogonal codes to the uplink reference signals assigned on the resource elements of the group, wherein the other of the pair of orthogonal codes is applied to the first downlink signals assigned on the resource elements of the group at the base station, wherein the length of each orthogonal code of the pair of orthogonal codes is equal to N; and for each frequency resource unit in the physical resource unit,
- grouping the resource elements assigned with only downlink reference signals of uplink and downlink reference signals into a plurality of groups, wherein one group comprises P nearest resource elements on time domain and each of remaining groups comprises N nearest resource elements on time domain, wherein P is an integer which is greater than 0 and less than N;
- for each of the remaining groups, applying the one of the pair of orthogonal codes to the second uplink signals assigned on the resource elements of the group, wherein the other of the pair of orthogonal codes is applied to the downlink reference signals assigned on the resource elements of the group at the base station; and
- for said one group, applying the one of the pair of orthogonal codes to the second uplink signals assigned on the P resource elements of said one group and N-P resource elements adjacent to the P resource elements on the time domain, wherein the other of the pair of orthogonal codes is applied to the downlink reference signals assigned on the P resource elements of said one group and the first downlink signals assigned on said N-P resource elements adjacent to the P resource elements on the time domain at the base station.

(36). The user equipment according to (32), wherein the first processing comprises:

for each frequency resource unit in the physical resource unit,
- grouping the resource elements assigned with uplink reference signals thereon into a plurality of groups, wherein one group comprises M nearest resource elements on time domain and each of remaining groups comprises N nearest resource elements on time domain, wherein N is an integer which is greater than 1 and M is an integer which is greater than 0 and less than N;
- for each of the remaining groups, applying the one of the pair of orthogonal codes to the uplink reference signals assigned on the resource elements of the group, wherein the other of the pair of orthogonal codes is applied to the first downlink signals assigned on the resource elements of the group at the base station, wherein the length of each orthogonal code of the pair of orthogonal codes is equal to N;
- for said one group, applying the one of the pair of orthogonal codes to the uplink reference signals assigned on the M resource elements of said one group and the second uplink signals assigned on N-M resource elements adjacent to the M resource elements on the time domain, wherein the other of the pair of orthogonal codes is applied to the first downlink signals assigned on the M resource elements of said one group and said N-M resource elements adjacent to the M resource elements on the time domain at the base station; and for each frequency resource unit in the physical resource unit,
- grouping the resource elements assigned with only downlink reference signals of uplink and downlink reference signals thereon into at least one group, wherein each group comprises N nearest resource elements on time domain; and
- for each group, applying the one of the pair of orthogonal codes to the second uplink reference signals assigned on the resource elements of the group, wherein the other of the pair of orthogonal codes is applied to the downlink reference signals assigned on the resource elements of the group at the base station.

(37). The user equipment according to (32), wherein the second uplink signals comprises a plurality of types of uplink reference signals, and wherein for each type of the uplink reference signals, the first processing comprises:
- for each frequency resource unit in the physical resource unit, grouping the resource elements assigned with the type of uplink reference signals thereon into at least one group, wherein each group comprises N nearest resource elements on time domain, wherein N is an integer which is greater than 1; and for each group, applying the one of the pair of orthogonal codes to the type of uplink reference signals assigned on the resource element of the group, wherein the other of the pair of orthogonal codes is applied to the first downlink signals assigned on the resource elements of the group at the base station, wherein the length of each orthogonal code of the pair orthogonal codes is equal to N.

(38). The user equipment according to (32), wherein the second uplink signals comprises a plurality of types of uplink reference signals, and wherein for each type of the uplink reference signals, the first processing comprises:
- for each frequency resource unit in the physical resource unit, grouping the resource elements assigned with the type of uplink reference signals into a plurality of groups, wherein one group comprises M nearest resource elements on time domain and each of remaining groups comprises N nearest resource elements on time domain, wherein N is an integer which is greater than 1 and M is an integer which is greater than 0 and less than N;
- for each of the remaining groups, applying the one of the pair of orthogonal codes to the type of uplink reference signals assigned on the resource element of the group, wherein the other of the pair of orthogonal codes is applied to the first downlink signals assigned on the resource elements of the group at the base station; and
- for said one group, applying the one of the pair of orthogonal codes to the type of uplink reference signals assigned on the M resource elements of said one group and the second uplink signals assigned on N-M resource elements adjacent to the M resource elements on the time domain, wherein the other of the pair of orthogonal codes is applied to the first downlink signals assigned on the M resource elements of said one group and said N-M resource elements adjacent to the M resource elements on the time domain at the base station.

(39). The user equipment according to (37) or (38), wherein the first downlink signals comprises a plurality of types of downlink reference signals, and wherein for each type of the downlink reference signals, the first processing further comprises:
- for each frequency resource unit in the physical resource unit, grouping the resource elements assigned with the type of downlink reference signals thereon into at least one group, wherein each group comprises N nearest resource elements on time domain; and
- for each group, applying the one of the pair of orthogonal codes to the second uplink signals assigned on the resource element of the group, wherein the other of the pair of orthogonal codes is applied to the type of downlink reference signals assigned on the resource elements of the group at the base station.

(40). The user equipment according to (37) or (38), the first downlink signals comprises a plurality of types of downlink reference signals, and wherein for each type of the downlink reference signals, the first processing further comprises:
- for each frequency resource unit in the physical resource unit, grouping the resource elements assigned with the type of downlink reference signals thereon into a plurality of groups, wherein one group comprises P nearest resource elements on time domain and each of remaining groups comprises N nearest resource elements on time domain, wherein P is an integer which is greater than 0 and less than N;
- for each of the remaining groups, applying the one of the pair of orthogonal codes to the second uplink signals assigned on the resource elements of the group, wherein the other of the pair of orthogonal codes is applied to the type of downlink reference signals assigned on the resource element of the group at the base station; and
- for said one group, applying the one of the pair of orthogonal codes to the second uplink signals assigned on the P resource elements of said one group and N-P resource elements adjacent to the P resource elements on the time domain, wherein the other of the pair of orthogonal codes is applied to the type of downlink reference signals assigned on the P resource elements of said one group and the first downlink signals assigned on said N-P resource elements adjacent to the P resource elements on the time domain at the base station.

(41). The user equipment according to (30), wherein the first processing is performed on one of time domain, frequency domain and code domain.

(42). The user equipment according to (41), wherein the first processing is performed on time domain, and the first processing is varied per TTI.

(43). The user equipment according to (41), wherein the first processing is performed on frequency domain, and the first processing is varied per frequency unit in a same TTI.

(44). The user equipment according to (30), wherein said suppressing at least part of the second uplink signals assigned on the resource elements assigned with first downlink reference signals thereon in the collided resource elements comprises:

suppressing the second uplink signals assigned on the resource elements assigned with only downlink reference signals of uplink and downlink reference signals thereon in the collided resource elements; and for each of the resource elements assigned with both downlink and uplink reference signals thereon in the collided resource elements,
- if the priority of the uplink reference signal assigned on the resource element is lower than that of the downlink reference signal assigned on the resource element, suppressing the uplink reference signal,
- otherwise the downlink reference signal is suppressed at the base station.

(45). The user equipment according to (30), wherein said suppressing is implemented by one of: not allocating said signal on the resource element by rate matching; puncturing said signal on the resource element; reducing the power of said signal on the resource element to zero; reducing the power of said signal on the resource element to a less value.

(46). The user equipment according to (45), wherein the suppressed signal is further reallocated to another resource element different from said resource element.

(47). The user equipment according to (30), wherein the second processing is varied per TTI.

(48). The user equipment according to (30), wherein whether the first processing or the second processing is performed on a collided resource element in the physical resource unit is determined based on the type of reference signals assigned on the collided resource element.

(49). The user equipment according to (30), wherein the first processing or the second processing is performed by further taking a TA (Time Advance) value into account.

(50). The user equipment according to (49), wherein the first processing is used to be further performed such that CDM is applied between the first downlink signal on each of collided resource elements in the physical resource unit and the second uplink signal assigned on a resource element at a position delayed from each of collided resource elements by the TA value on time domain, and wherein the second processing further comprises: suppressing second uplink signals assigned on resource elements at positions delayed from the resource elements assigned with downlink reference signals thereon in the collided resource elements by the TA on time domain.

(51). The user equipment according to (27), wherein whether the first downlink signals and the second uplink signals are for a same user equipment or for different user equipments is signaled from the base station to the user equipment in an implicit way or in an explicit way.

(52). The user equipment according to (30), wherein whether the first processing and/or the second processing is performed, the specific setting of the first processing or the second processing and disabling of the first processing and/or the second processing is signaled from the base station to the user equipment in an explicit way.

(53). The user equipment according to (27), wherein the waveforms used by the second uplink signals and the waveforms used by the first downlink signals are same with or different from each other.

(54). The user equipment according to (30), wherein one or a plurality of neighbor resource elements of the collided resource element to be performed the first processing or the second processing is reserved based on a waveform technique.

(55). A wireless communication method for a physical resource unit in a full duplex mode corresponding to one Transmission Time Interval (TTI), the physical resource unit being assigned with uplink and downlink signals to be transmitted in a TTI, the method comprising:

performing at least one of a first processing and a second processing on at least the downlink signals of uplink and downlink signals before transmission; and transmitting the downlink signals on the physical resource unit in a TTI from a base station and transmitting the uplink signals on the physical resource unit in the TTI from a user equipment, wherein the first processing is used to be performed such that Code Division Multiplexing (CDM) is applied between the downlink signal and the uplink signal assigned on each of at least part of collided resource elements in the physical resource unit, each of the collided resource elements being assigned with both a downlink signal and an uplink signal at least one of which is a reference signal, and the second processing comprises suppressing at least part of the downlink signals assigned on at least resource elements assigned with uplink reference signals thereon in the collided resource elements.

(56). The wireless communication method according to (55), wherein the first processing or the second processing is different depending on whether the uplink signals and the downlink signals are for a same user equipment or different user equipments.

(57). The wireless communication method according to (56), wherein the uplink signals and the downlink signals are for different user equipments, and the at least part of collided resource elements is only the resource elements assigned with uplink reference signals thereon in the collided resource elements, and wherein the first processing comprises:

grouping the resource elements assigned with uplink reference signals thereon in the collided resource elements into at least one group; and for each group, applying one of a pair of orthogonal codes to the downlink signals assigned on the resource elements of the group, and applying the other of the pair of orthogonal codes to the uplink reference signals assigned on the resource elements of the group.

(58). The wireless communication method according to (56), wherein the uplink signals and the downlink signals are for a same user equipment, and the at least part of collided resource elements is all of the collided resource elements, and wherein the first processing comprises:

grouping the resource elements assigned with uplink reference signals thereon in the collided resource elements into at least one group, and for each group, applying one of a pair of orthogonal codes to the downlink signals assigned on the resource elements of the group, and applying the other of the pair of orthogonal codes to the uplink reference signals assigned on the resource elements of the group; and grouping the resource elements assigned with only downlink reference signals of uplink and downlink reference signals thereon in the collided resource elements into at least one group, and for each group, applying the one of the pair of orthogonal codes to the downlink reference signals assigned on the resource elements of the group, and applying the other of the pair of orthogonal codes is applied to the uplink signals assigned on the resource elements of the group.

(59). The wireless communication method according to (57) or (58), grouping the resource elements is based on at least one of the positions of the resource elements in the physical resource unit and the types of the reference signals assigned on the resource elements.

(60). The wireless communication method according to (59), wherein the first processing comprises:

for each frequency resource unit in the physical resource unit, grouping the resource elements assigned with uplink reference signals thereon into at least one group, wherein each group comprises N nearest resource elements on time domain, wherein N is an integer which is greater than 1; and for each group, applying the one of the pair of orthogonal codes to the downlink signals assigned on the resource elements of the group, and applying the other of the pair of orthogonal codes to the uplink reference signals assigned on the resource elements of the group, wherein the length of each orthogonal code of the pair of orthogonal codes is equal to N.

(61). The wireless communication method according to (59), wherein the first processing comprises:

for each frequency resource unit in the physical resource unit, grouping the resource elements assigned with uplink reference signals thereon into a plurality of groups, wherein one group comprises M nearest resource elements on time domain and each of remaining groups comprises N nearest resource elements on time domain, wherein N is an integer which is greater than 1 and M is an integer which is greater than 0 and less than N;

for each of the remaining groups, applying the one of the pair of orthogonal codes to the downlink signals assigned on the resource elements of the group, and applying the other of the pair of orthogonal codes to the uplink reference signals assigned on the resource elements of the group, wherein the length of each orthogonal code of the pair of orthogonal codes is equal to N; and for said one group, applying the one of the pair of orthogonal codes to the downlink signals assigned on the M resource elements of said one group and N-M resource elements adjacent to the M resource elements on the time domain, and applying the other of the pair of orthogonal codes to the uplink reference signals assigned on the M resource elements of said one group and uplink signals assigned on said N-M resource elements adjacent to the M resource elements on the time domain.

(62). The wireless communication method according to (60) or (61), wherein the first processing further comprises:

for each frequency resource unit in the physical resource unit, grouping the resource elements assigned with only downlink reference signals of uplink and downlink reference signals thereon into at least one group, wherein each group comprises N nearest resource elements on time domain; and for each group, applying the one of the pair of orthogonal codes to the downlink reference signals assigned on the resource elements of the group, and applying the other of the pair of orthogonal codes to the uplink signals assigned on the resource elements of the group.

(63). The wireless communication method according to (60) or (61), wherein the first processing further comprises:

for each frequency resource unit in the physical resource unit, grouping the resource elements assigned with only downlink reference signals of uplink and downlink reference signals into a plurality of groups, wherein one group comprises P nearest resource elements on time domain and each of remaining groups comprises N nearest resource elements on time domain, wherein P is an integer which is greater than 0 and less than N;

for each of the remaining groups, applying the one of the pair of orthogonal codes to the downlink reference signals assigned on the resource elements of the group, and applying the other of the pair of orthogonal codes to the uplink signals assigned on the resource elements of the group; and for said one group, applying the one of the pair of orthogonal codes to the downlink reference signals assigned on the P resource elements of said one group and downlink signals assigned on N-P resource elements adjacent to the P resource elements on the time domain, and applying the other of the pair of orthogonal codes to the uplink signals assigned on the P resource elements of said one group and said N-P resource elements adjacent to the P resource elements on the time domain.

(64). The wireless communication method according to (59), wherein the uplink signals received on the physical resource unit comprises a plurality of types of uplink reference signals, and wherein for each type of the uplink reference signals, the first processing comprises:

for each frequency resource unit in the physical resource unit, grouping the resource elements assigned with the type of uplink reference signals thereon into at least one group, wherein each group comprises N nearest resource elements on time domain, wherein N is an integer which is greater than 1; and for each group, applying the one of the pair of orthogonal codes to downlink signals assigned on the resource element of the group, and applying the other of the pair of orthogonal codes to the type of uplink reference signals assigned on the resource elements of the group, wherein the length of each orthogonal code of the pair orthogonal codes is equal to N.

(65). The wireless communication method according to (59), wherein the uplink signals received on the physical resource unit comprises a plurality of types of uplink reference signals, and wherein for each type of the uplink reference signals, the first processing comprises:

for each frequency resource unit in the physical resource unit, grouping the resource elements assigned with the type of uplink reference signals into a plurality of groups, wherein one group comprises M nearest resource elements on time domain and each of remaining groups comprises N nearest resource elements on time domain, wherein N is an integer which is greater than 1 and M is an integer which is greater than 0 and less than N;

for each of the remaining groups, applying the one of the pair of orthogonal codes to downlink signals assigned on the resource element of the group, and applying the other of the pair of orthogonal codes to the type of uplink reference signals assigned on the resource elements of the group; and for said one group, applying the one of the pair of orthogonal codes to downlink signals assigned on the M resource elements of said one group and N-M resource elements adjacent to the M resource elements on the time domain, and applying the other of the pair of orthogonal codes to the type of uplink reference signals assigned on the M resource elements of said one group and uplink signals assigned on said N-M resource elements adjacent to the M resource elements on the time domain.

(66). The wireless communication method according to (64) or (65), wherein the downlink signals transmitted on the physical resource unit comprises a plurality of types of downlink reference signals, and wherein for each type of the downlink reference signals, the first processing further comprises:

for each frequency resource unit in the physical resource unit, grouping the resource elements assigned with the type of downlink reference signals thereon into at least one group, wherein each group comprises N nearest resource elements on time domain; and for each group, applying the one of the pair of orthogonal codes to the type of downlink reference signals assigned on the resource element of the group, and applying the other of the pair of orthogonal codes to the uplink signals assigned on the resource elements of the group.

(67). The wireless communication method according to (64) or (65), wherein the downlink signals transmitted on the physical resource unit comprises a plurality of types of downlink reference signals, and wherein for each type of the downlink reference signals, the first processing further comprises:

for each frequency resource unit in the physical resource unit, grouping the resource elements assigned with the type of downlink reference signals thereon into a plurality of groups, wherein one group comprises P nearest resource elements on time domain and each of remaining groups comprises N nearest resource elements on time domain, wherein P is an integer which is greater than 0 and less than N;

for each of the remaining groups, applying the one of the pair of orthogonal codes to the type of downlink reference signals assigned on the resource elements of the group, and applying the other of the pair of orthogonal codes to the uplink signals assigned on the resource element of the group; and for said one group, applying the one of the pair of orthogonal codes to the type of downlink reference signals assigned on the P resource elements of said one group and downlink signals assigned on N-P resource elements adjacent to the P resource elements on the time domain, and applying the other of the pair of orthogonal codes to the uplink signals assigned on the P resource elements of said one group and said N-P resource elements adjacent to the P resource elements on the time domain.

(68). The wireless communication method according to (55), wherein the first processing is performed on one of time domain, frequency domain and code domain.

(69). The wireless communication method according to (68), wherein the first processing is performed on time domain, and the first processing is varied per TTI.

(70). The wireless communication method according to (68), wherein the first processing is performed on frequency domain, and the first processing is varied per frequency unit in a same TTI.

(71). The wireless communication method according to (56), wherein the uplink signals and the downlink signals are for different user equipments, and said suppressing at least part of the downlink signals assigned on the resource elements assigned with uplink reference signals thereon in the collided resource elements comprises:

suppressing all of the downlink signals assigned on the resource elements assigned with uplink reference signals thereon in the collided resource elements.

(72). The wireless communication method according to (56), wherein the uplink signals and the downlink signals are a same user equipment, and said suppressing at least part of the downlink signals assigned on the resource elements assigned with uplink reference signals thereon in the collided resource elements comprises:

suppressing the downlink signals assigned on the resource elements assigned with only uplink reference signals of uplink and downlink reference signals thereon in the collided resource elements;

suppressing the uplink signals assigned on the resource elements assigned with only downlink reference signals of uplink and downlink reference signals thereon in the collided resource elements; and for each of the resource elements assigned with both downlink and uplink reference signals thereon in the collided resource elements, if the priority of the downlink reference signal assigned on the resource element is lower than that of the uplink reference signal assigned on the resource element, suppressing the downlink reference signal, otherwise suppressing the uplink reference signal.

(73). The wireless communication method according to (55), wherein said suppressing is implemented by one of: not allocating said signal on the resource element by rate matching; puncturing said signal on the resource element; reducing the power of said signal on the resource element to zero; reducing the power of said signal on the resource element to a less value.

(74). The wireless communication method according to (73), wherein the suppressed signal is further reallocated to another resource element different from said resource element.

(75). The wireless communication method according to (55), wherein the second processing is varied per TTI.

(76). The wireless communication method according to (55), wherein whether the first processing or the second processing is performed on a collided resource element in the physical resource unit is determined based on the type of reference signals assigned on the collided resource element.

(77). The wireless communication method according to (58) or (72), wherein the first processing or the second processing is performed by further taking a TA (Time Advance) value into account.

(78). The wireless communication method according to (77), wherein the first processing is used to be further performed such that CDM is applied between the downlink signal on each of collided resource elements in the physical resource unit and the uplink signal assigned on a resource element at a position delayed from each of collided resource elements by the TA value on time domain, and wherein the second processing further comprises: suppressing uplink signals assigned on resource elements at positions delayed from the resource elements assigned with downlink reference signals thereon in the collided resource elements by the TA value on time domain.

(79). The wireless communication method according to (55), wherein whether the uplink signals and downlink signals are for a same user equipment or for different user equipments is signaled from a base station transmitting the downlink signals to a user equipment transmitting the uplink signals in an implicit way or in an explicit way.

(80). The wireless communication method according to (55), wherein whether the first processing and/or the second processing is performed, the specific setting of the first processing or the second processing and disabling of the first processing and/or the second processing is signaled from a base station transmitting the downlink signals to a user equipment transmitting the uplink signals in an explicit way.

(81). The wireless communication method according to (55), wherein the waveforms used by the uplink signals and the waveforms used by the downlink signals are same with or different from each other.

(82). The wireless communication method according to (81), wherein one or a plurality of neighbor resource elements of the collided resource element to be performed the first processing or the second processing is reserved based on a waveform technique.

In addition, embodiments of the present disclosure can also provide an integrated circuit which comprises module(s) for performing the step(s) in the above respective communication methods. Further, embodiments of the present can also provide a computer readable storage medium having stored thereon a computer program containing a program code which, when executed on a computing device, performs the step(s) of the above respective communication methods.

The invention claimed is:

1. A base station comprising:
    circuitry operative to perform at least first processing on downlink signals to be transmitted on a physical resource unit in a full duplex mode corresponding to one Transmission Time Interval (TTI);
    a transmitter operative to transmit the processed downlink signals on the physical resource unit in a TTI; and
    a receiver operative to receive uplink signals on the physical resource unit in the TTI,
    wherein the first processing includes applying Code Division Multiplexing (CDM) to only the downlink signals and the uplink signals assigned on at least part of collided resource elements in the physical resource unit, each of the collided resource elements being assigned with both a downlink signal and an uplink signal at least one of which is a reference signal, and
    wherein the CDM includes applying a first one of a pair of orthogonal codes to one or more of the downlink signals assigned on the at least part of collided resource elements in the physical resource unit in the TTI,
    wherein a second one of the pair of orthogonal codes is applied to one or more of the uplink signals assigned on the at least part of collided resource elements in the physical resource unit in the TTI at a user equipment from which the uplink signals are received,
    wherein a user equipment to which the processed downlink signals are transmitted is different from the user equipment from which the uplink signals are received, and the at least part of collided resource elements is only resource elements assigned with uplink reference signals thereon in the collided resource elements,
    wherein the first processing comprises:
        for each frequency resource unit in the physical resource unit, grouping the resource elements assigned with the uplink reference signals thereon in the collided resource elements into at least one group, wherein the grouping the resource elements is based on at least one of positions of the resource elements in the physical resource unit and types of the reference signals assigned on the resource elements, and wherein each group comprises N nearest resource elements on time domain, wherein N is an integer which is greater than 1, and
        for each group, applying the first one of the pair of orthogonal codes to the downlink signals assigned on the resource elements of the group, wherein the second one of the pair of orthogonal codes is applied to the uplink reference signals assigned on the resource elements of the group at the user equipment from which the uplink signals are received, wherein a length of each orthogonal code of the pair of orthogonal codes is equal to N.

2. The base station according to claim 1, wherein the circuitry is further operative to perform second processing on the downlink signals to be transmitted, the second processing includes suppressing at least part of the downlink signals assigned on the resource elements assigned with the uplink reference signals thereon in the collided resource elements.

3. The base station according to claim 1, wherein
    the first processing comprises:
        grouping the resource elements assigned with only downlink reference signals of uplink and downlink reference signals thereon in the collided resource elements into at least one group, and for each group, applying the first one of the pair of orthogonal codes to the downlink reference signals assigned on the resource elements of the group, wherein the second one of the pair of orthogonal codes is applied to the uplink signals assigned on the resource elements of the group at the user equipment from which the uplink signals are received.

4. The base station according to claim 2, wherein the circuitry is further operative to perform second processing on the downlink signals to be transmitted, and
    wherein the second processing includes:
        suppressing all of the downlink signals assigned on the resource elements assigned with the uplink reference signals thereon in the collided resource elements.

5. The base station according to claim 2, wherein the circuitry is further operative to perform second processing on the downlink signals to be transmitted, and
    wherein the second processing includes:
        suppressing the downlink signals assigned on the resource elements assigned with only the uplink reference signals of uplink and downlink reference signals thereon in the collided resource elements; and
        for each of the resource elements assigned with both the downlink and uplink reference signals thereon in the collided resource elements,
            if a priority of a downlink reference signal assigned on a resource element is lower than a priority of an uplink reference signal assigned on the resource element, suppressing the downlink reference signal,
            otherwise the uplink reference signal is suppressed at the user equipment from which the uplink signals are received, and wherein
    when the second processing is performed, the uplink signals assigned on the resource elements assigned with only downlink reference signals of uplink and downlink reference signals thereon in the collided resource elements is suppressed at the user equipment from which the uplink signals are received.

6. The base station according to claim 1, wherein the circuitry is further operative to perform second processing on the downlink signals to be transmitted, the second processing includes suppressing at least part of the downlink signals assigned on the resource elements assigned with the uplink reference signals thereon in the collided resource elements, and whether the first processing or the second processing is performed on a collided resource element in the physical resource unit is determined based on a type of reference signals assigned on the collided resource element.

7. A user equipment comprising:
- a receiver operative to receive first downlink signals from a base station;
- circuitry operative to perform first processing on second uplink signals to be transmitted to the base station; and
- a transmitter operative to transmit the processed second uplink signals to the base station,
- wherein, when the first downlink signals are received and the second uplink signals are transmitted on a physical resource unit in a full duplex mode corresponding to one Transmission Time Interval (TTI),
- wherein the first processing includes applying Code Division Multiplexing (CDM) to only the first downlink signals and the second uplink signals assigned on at least part of collided resource elements in the physical resource unit, each of the collided resource elements being assigned with both a downlink signal and an uplink signal at least one of which is a reference signal, and
- wherein the CDM includes applying a first one of a pair of orthogonal codes to one or more of the second uplink signals assigned on the at least part of collided resource elements in the physical resource unit in the TTI,
- wherein a second one of the pair of orthogonal codes is applied to one or more of the first downlink signals assigned on the at least part of collided resource elements in the physical resource unit in the TTI at the base station from which the first downlink signals are received,
- wherein the at least part of collided resource elements is only resource elements assigned with uplink reference signals thereon in the collided resource elements,
- wherein the first processing comprises:
  - for each frequency resource unit in the physical resource unit, grouping the resource elements assigned with the uplink reference signals thereon in the collided resource elements into at least one group, wherein the grouping the resource elements is based on at least one of positions of the resource elements in the physical resource unit and types of the reference signals assigned on the resource elements, and wherein each group comprises N nearest resource elements on time domain, wherein N is an integer which is greater than 1, and
  - for each group, applying the first one of the pair of orthogonal codes to the second uplink signals assigned on the resource elements of the group, wherein the second one of the pair of orthogonal codes is applied to the first downlink signals assigned on the resource elements of the group at the base station from which the first downlink signals are received, wherein a length of each orthogonal code of the pair of orthogonal codes is equal to N.

8. The user equipment according to claim 7, wherein the receiver receives the first downlink signals on the physical resource unit from the base station, wherein first uplink signals are transmitted on the physical resource unit from a second user equipment different from the user equipment, and wherein
- before being transmitted from the base station, at least the first processing and second processing is performed on the first downlink signals at the base station, wherein the first processing includes applying the CDM to the first downlink signals and the first uplink signals assigned on each of the at least part of collided resource elements in the physical resource unit, each of the collided resource elements being assigned with both the first downlink signals and the first uplink signals at least one of which is a reference signal, and
- the second processing includes suppressing the first downlink signals assigned on the resource elements assigned with the uplink reference signals thereon in the collided resource elements.

9. The user equipment according to claim 7, wherein the transmitter transmits the second uplink signals on the physical resource unit to the base station, wherein second downlink signals are transmitted on the physical resource unit to a second user equipment different from the user equipment from the base station:
- wherein
  - before being transmitted from the base station, at least one of the first processing and second processing is performed on the second downlink signals at the base station,
  - and
- wherein the second processing includes suppressing the second downlink signals assigned on the resource elements assigned with the uplink reference signals thereon in the collided resource elements.

10. The user equipment according to claim 7, wherein the receiver receives the first downlink signals on the physical resource unit from the base station and the transmitter transmits the second uplink signals on the physical resource unit to the base station, and wherein:
- the circuitry is operative to perform second processing on the second uplink signals before transmission, and
- the second processing includes suppressing at least part of the second uplink signals assigned on the resource elements assigned with first downlink reference signals thereon in the collided resource elements.

11. The user equipment according to claim 10, wherein the first processing comprises:
- grouping the resource elements assigned with downlink reference signals thereon in the collided resource elements into at least one group, and for each group, applying the first one of the pair of orthogonal codes to the second uplink signals assigned on the resource elements of the group, wherein the second one of the pair of orthogonal codes is applied to the downlink reference signals assigned on the resource elements of the group at the base station; and
- grouping the resource elements assigned with only the uplink reference signals of uplink and downlink reference signals thereon in the collided resource elements into at least one group, and for each group, applying the first one of the pair of orthogonal codes to the uplink reference signals assigned on the resource elements of the group, wherein the second one of the pair of orthogonal codes is applied to the first downlink signals assigned on the resource elements of the group at the base station.

12. The user equipment according to claim 10, wherein said suppressing at least part of the second uplink signals assigned on the resource elements assigned with first downlink reference signals thereon in the collided resource elements comprises:
- suppressing the second uplink signals assigned on the resource elements assigned with only downlink reference signals of uplink and downlink reference signals thereon in the collided resource elements; and for each of the resource elements assigned with both downlink and uplink reference signals thereon in the collided resource elements, if a priority of an uplink reference signal assigned on a resource element is lower than a priority of a downlink reference signal assigned on the resource element, suppressing the uplink reference signal, otherwise the downlink reference signal is suppressed at the base station.

13. The user equipment according to claim 10, wherein whether the first processing or the second processing is performed on a collided resource element in the physical resource unit is determined based on a type of reference signals assigned on the collided resource element.

14. The user equipment according to claim 10, wherein the first processing or the second processing is performed by further taking a TA (Time Advance) value into account.

15. The user equipment according to claim 14, wherein the first processing includes applying the CDM to the first downlink signal on each of collided resource elements in the physical resource unit and the second uplink signal assigned on a resource element at a position delayed from each of collided resource elements by the TA value on time domain, and wherein the second processing further comprises: suppressing the second uplink signals assigned on resource elements at positions delayed from the resource elements assigned with downlink reference signals thereon in the collided resource elements by the TA value on time domain.

16. A wireless communication method for a physical resource unit in a full duplex mode corresponding to one Transmission Time Interval (TTI), the physical resource unit being assigned with uplink and downlink signals to be transmitted in a TTI, the method comprising:

performing at least first processing on the downlink signals to be transmitted; and transmitting the downlink signals on the physical resource unit in the TTI from a base station and transmitting the uplink signals on the physical resource unit in the TTI from a user equipment, wherein the first processing includes applying Code Division Multiplexing (CDM) to only the downlink signals and the uplink signals assigned on at least part of collided resource elements in the physical resource unit, each of the collided resource elements being assigned with both a downlink signal and an uplink signal at least one of which is a reference signal, and wherein the CDM including applying a first one of a pair of orthogonal codes to one or more uplink reference signals assigned on the at least part of collided resource elements in the physical resource unit, wherein a second one of the pair of orthogonal codes is applied to one or more of the downlink signals assigned on the at least part of collided resource elements in the physical resource unit at the base station from which the downlink signals are received, wherein a user equipment to which the processed downlink signals are transmitted is different from the user equipment from which the uplink signals are received, and the at least part of collided resource elements is only resource elements assigned with the uplink reference signals thereon in the collided resource elements, wherein the first processing comprises:

for each frequency resource unit in the physical resource unit, grouping the resource elements assigned with the uplink reference signals thereon in the collided resource elements into at least one group, wherein the grouping the resource elements is based on at least one of positions of the resource elements in the physical resource unit and types of the reference signals assigned on the resource elements, and wherein each group comprises N nearest resource elements on time domain, wherein N is an integer which is greater than 1, and for each group, applying the first one of the pair of orthogonal codes to the downlink signals assigned on the resource elements of the group, wherein the second one of the pair of orthogonal codes is applied to the uplink reference signals assigned on the resource elements of the group at the user equipment from which the uplink signals are received, wherein a length of each orthogonal code of the pair of orthogonal codes is equal to N.

17. The wireless communication method according to claim 16, further comprising:

performing second processing on the downlink signals to be transmitted, wherein the second processing includes suppressing at least part of the downlink signals assigned on the resource elements assigned with the uplink reference signals thereon in the collided resource elements, and wherein the first processing or the second processing is different depending on whether the uplink signals and the downlink signals are for a same user equipment or different user equipments.

* * * * *